United States Patent [19]

Hayashi et al.

[11] Patent Number: 5,617,187
[45] Date of Patent: Apr. 1, 1997

[54] IMAGE READING APPARATUS, COPYING APPARATUS, IMAGE PROCESSING APPARATUS, AND IMAGE PROCESSING METHOD

[75] Inventors: Toshio Hayashi, Kawasaki; Shinobu Arimoto, Yokohama; Kazuo Yoshinaga, Machida; Takehiko Nakai, Tokyo; Tsutomu Utagawa, Yokohama; Tetsuya Nagase, Kawasaki; Nobuatsu Sasanuma, Yokohama, all of Japan

[73] Assignee: Canon Kabushiki Kaisha, Tokyo, Japan

[21] Appl. No.: 517,609

[22] Filed: Aug. 22, 1995

Related U.S. Application Data

[62] Division of Ser. No. 139,172, Oct. 21, 1993, Pat. No. 5,471,281.

[30] Foreign Application Priority Data

Oct. 23, 1992 [JP] Japan .................................. 4-286351
Oct. 23, 1992 [JP] Japan .................................. 4-286379
Oct. 23, 1992 [JP] Japan .................................. 4-286382

[51] Int. Cl.$^6$ ............................................ G03G 21/04
[52] U.S. Cl. .......................... 399/32; 250/271; 36/71
[58] Field of Search ........................... 355/201, 208, 355/214, 228, 68, 69; 358/504, 509, 406, 475, 501; 250/271, 556; 356/71

[56] References Cited

U.S. PATENT DOCUMENTS

| | | | |
|---|---|---|---|
| 4,047,033 | 9/1977 | Malmberg et al. | 250/341 |
| 4,739,377 | 4/1988 | Allen | 355/133 |
| 4,791,449 | 12/1988 | Foley et al. | 355/201 |
| 4,807,026 | 2/1989 | Nishioka et al. | 358/98 |
| 5,471,281 | 11/1995 | Hayashi et al. | 355/201 |

FOREIGN PATENT DOCUMENTS 0342060  11/1989  European Pat. Off.
62-217216  9/1987  Japan.

Primary Examiner—Joan H. Pendegrass
Attorney, Agent, or Firm—Fitzpatrick, Cella, Harper & Scinto

[57] ABSTRACT

This invention has as its object to reduce the apparatus scale by simplifying the arrangement of an image reading apparatus for radiating light including both visible and non-visible components, and detecting light obtained from a predetermined image, and provides an image reading apparatus which has illumination means for simultaneously radiating both light including a visible component and light including a non-visible component, and detection means for detecting light obtained from a predetermined image in accordance with the light radiated from the illumination means, including filter means which can be switched in accordance with whether the visible or non-visible component is radiated from the illumination means onto the predetermined image, and control means for controlling a switching operation of the filter means.

18 Claims, 35 Drawing Sheets

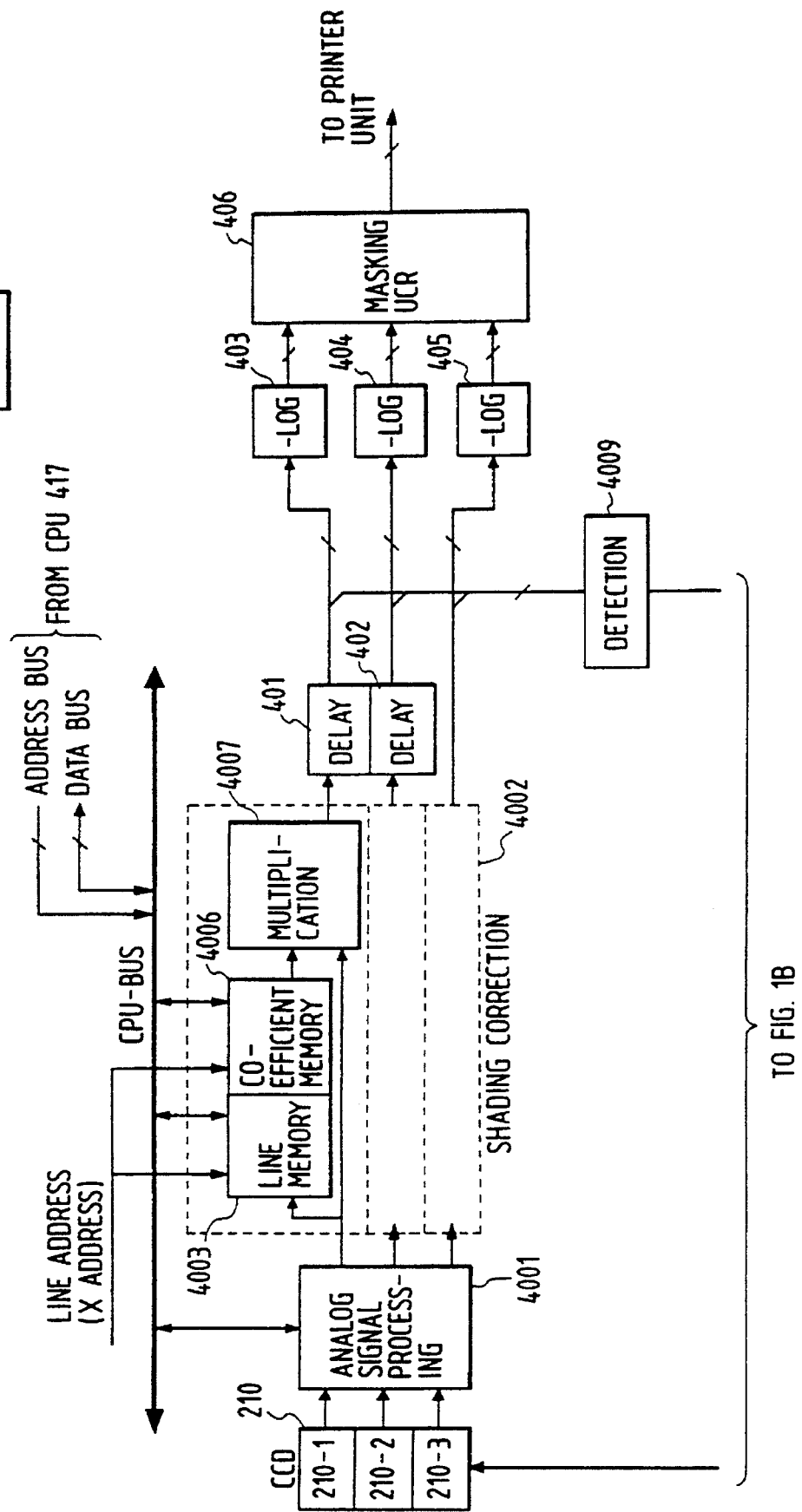

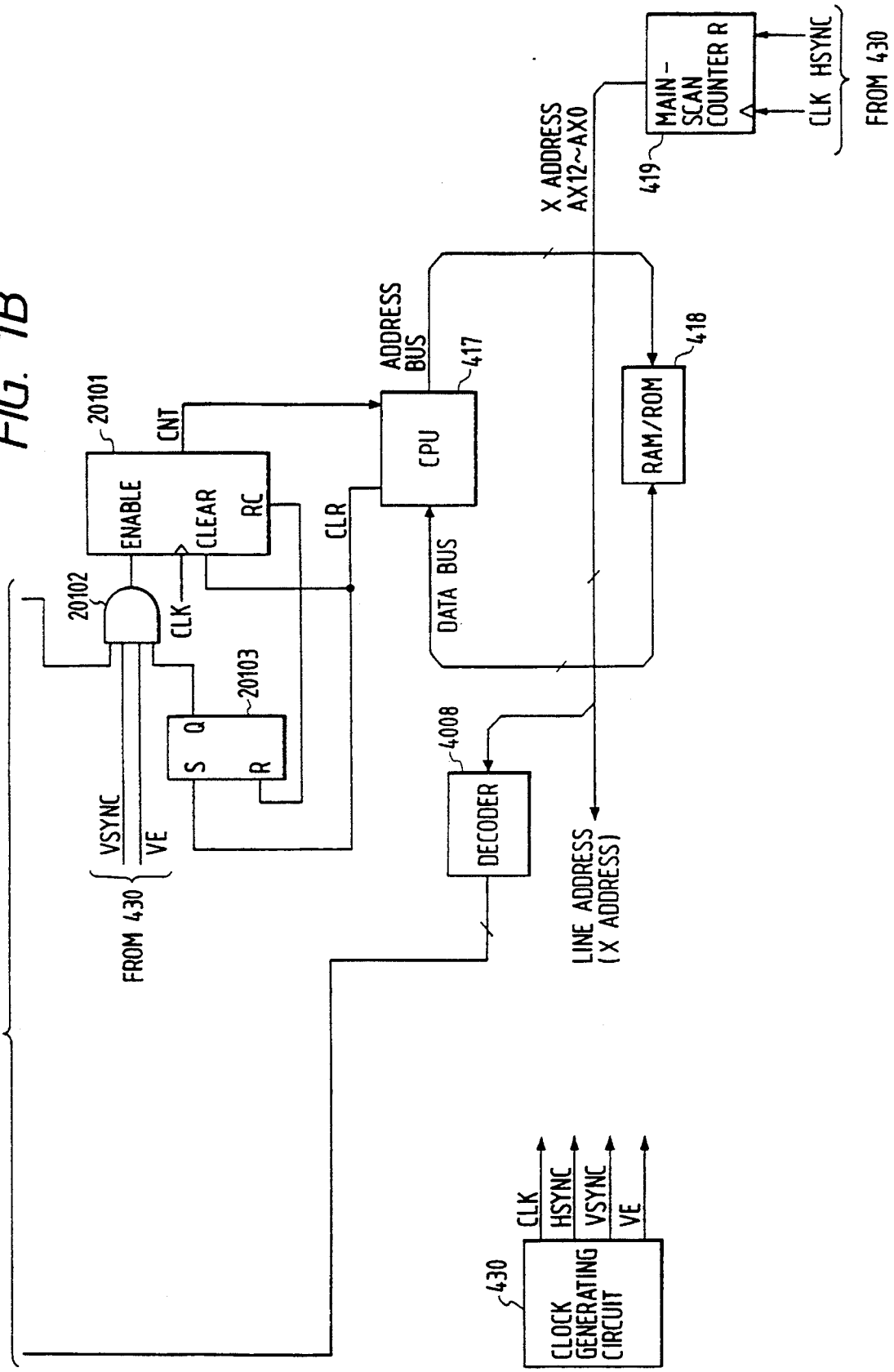

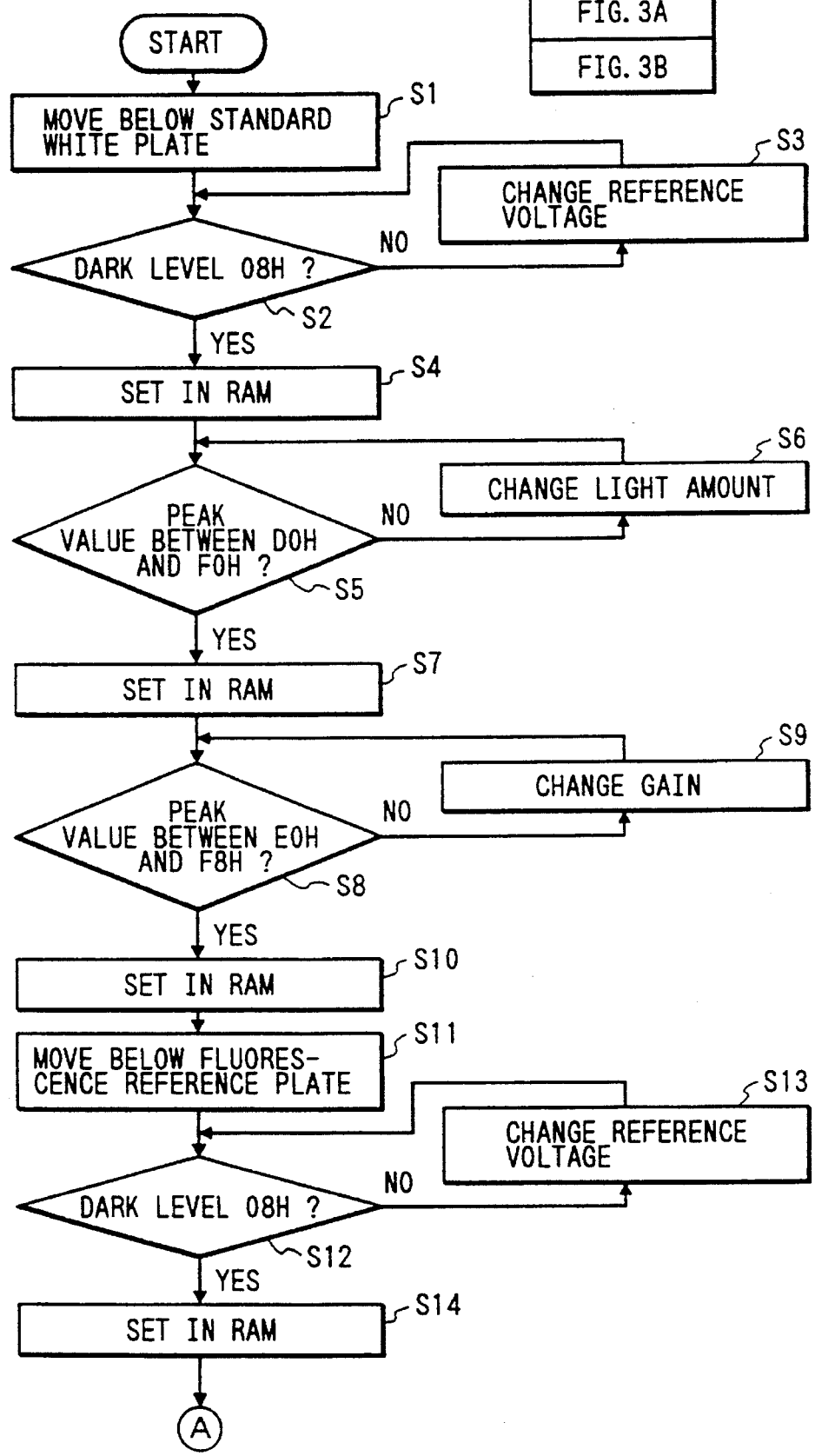

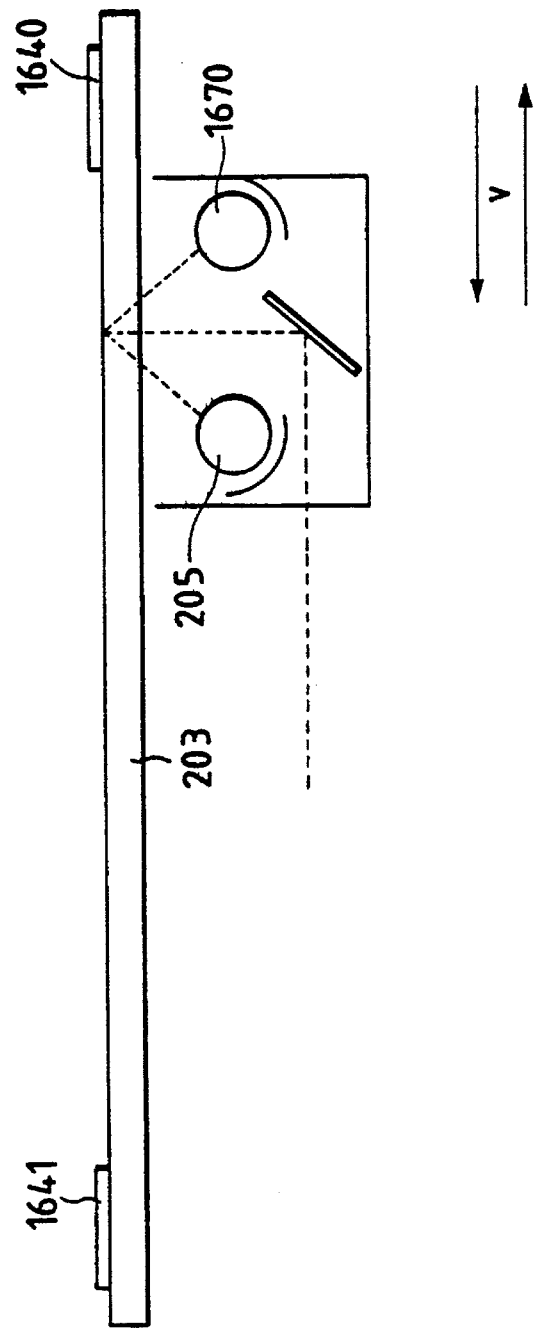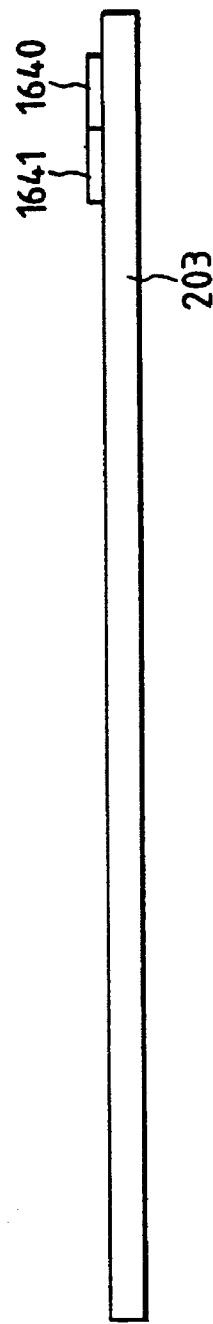
FIG. 34
FIG. 36

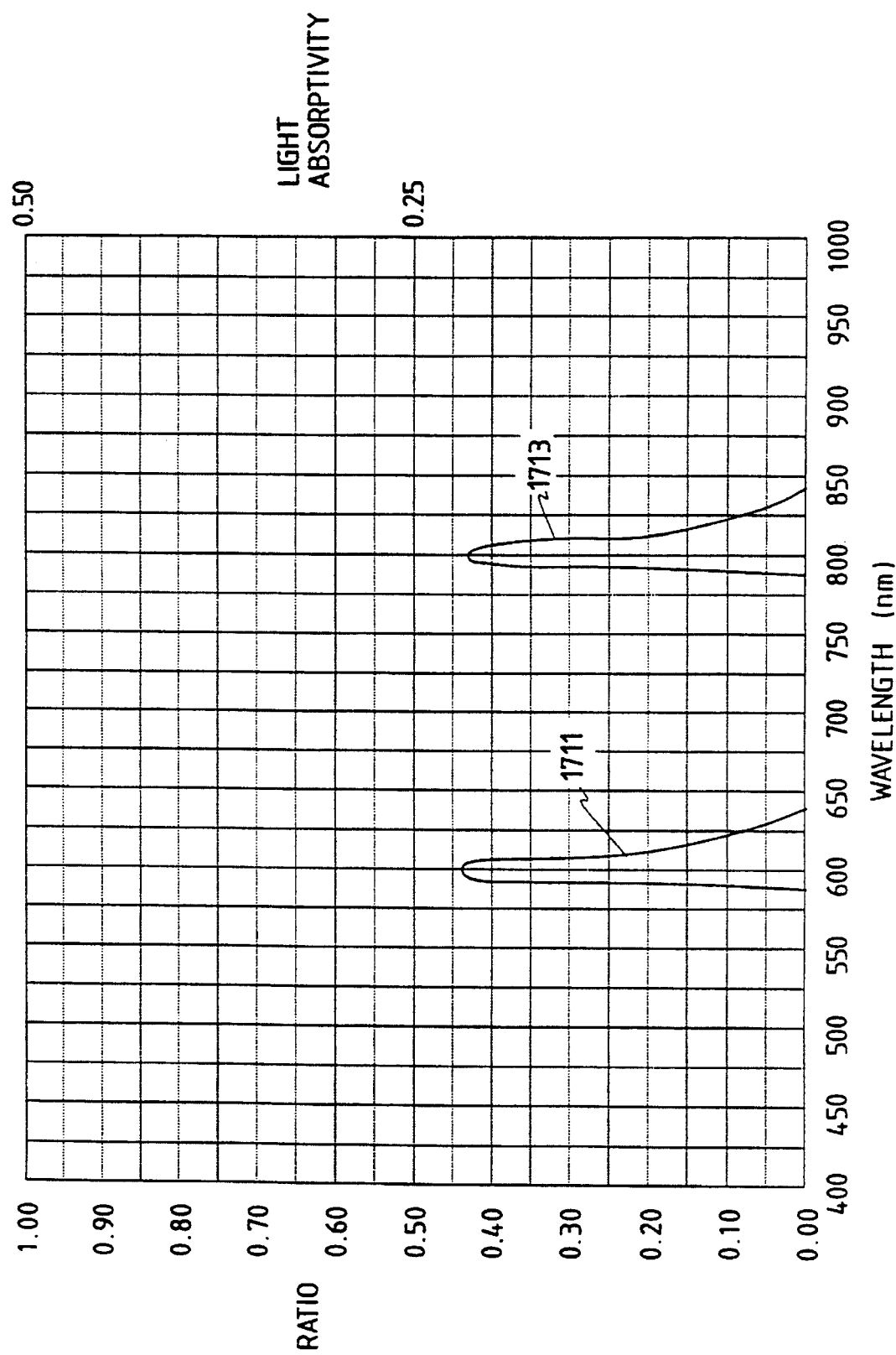

IMAGE READING APPARATUS, COPYING APPARATUS, IMAGE PROCESSING APPARATUS, AND IMAGE PROCESSING METHOD

This application is a division of application No. 08/139,172 filed Oct. 21, 1993 now U.S. Pat. No. 5,471,281.

BACKGROUND OF THE INVENTION

1. Field of the Invention

The present invention relates to an image reading apparatus, a copying apparatus, and an image processing apparatus, which have a function of discriminating a specific original.

2. Related Background Art

Conventionally, various methods associated with recognition of, e.g., a specific original, have been proposed.

Methods of recognizing that an image pattern of an original is defined by a line image, or recognizing a color tone of an image original, have also been proposed.

Furthermore, in another method, a specific mark is printed with a fluorescent ink, which reflects visible light upon radiation of ultraviolet rays onto a specific original itself, so as to identify an original print from copies on the basis of the presence/absence of the fluorescent mark.

However, when these methods are applied to a copying machine, it is difficult to detect a specific original which is located at an arbitrary angle with respect to an arbitrary position on an original table of the copying machine, and hence, it is difficult to prevent forgery.

Even when line image information or a color tone of an original is detected, some normal originals may exhibit equivalent characteristics as those of a specific original, and a normal original may be erroneously determined to be a copy-inhibited original.

Furthermore, in the copying machine which detects a specific original on the basis of the presence/absence of a fluorescent mark, both an arrangement for detecting ultraviolet rays and an arrangement for detecting visible light for a copying operation are required, and the apparatus scale undesirably becomes very large. In addition, the levels of the detected ultraviolet rays and visible light vary depending on individual differences of apparatuses, and it is difficult to achieve precise detection.

SUMMARY OF THE INVENTION

The present invention has been made in consideration of the above-mentioned problems, and has as its object to provide an image reading apparatus with high discrimination precision.

It is another object of the present invention to provide an image reading apparatus which suffers less from aging.

It is still another object of the present invention to provide an image reading apparatus which can discriminate a specific original.

It is still another object of the present invention to provide an image processing apparatus and an image processing method, which can discriminate a specific image by detecting non-visible light from a predetermined image.

It is still another object of the present invention to provide an image reading apparatus with a simple circuit arrangement.

In order to achieve the above objects, according to a preferred aspect of the present invention, there is provided an image reading apparatus which comprises illumination means for simultaneously radiating both light including a visible component and light including a non-visible component, and detection means for detecting light obtained from a predetermined image in accordance with the light radiated from the illumination means, comprising: filter means which can be switched in accordance with whether the visible or non-visible component is radiated from the illumination means onto the predetermined image; and control means for controlling a switching operation of the filter means.

It is still another object of the present invention to provide an image processing apparatus, an image reading apparatus, a copying machine, and an image processing method, which have a novel function.

Other objects and features of the present invention will become apparent from the following description of the embodiment taken in conjunction with the accompanying drawings.

BRIEF DESCRIPTION OF THE DRAWINGS

FIG. 1 is comprised of FIG. 1A and FIG. 1B showing block diagrams of a signal processing unit according to the first embodiment of the present invention;

FIG. 34 is a schematic sectional view showing a lamp and a shading plate of the ninth embodiment;

FIG. 36 is a side view showing a state wherein two shading plates of the tenth embodiments are integrated;

FIG. 38 is a graph showing the characteristics of still another fluorescent paint.

DETAILED DESCRIPTION OF THE PREFERRED EMBODIMENTS

First Embodiment

The preferred embodiments of the present invention will be described hereinafter.

In the embodiments to be described below, the present invention is applied to a copying machine. However, the present invention is not limited to this. For example, the present invention can be applied to various other apparatuses such as an image scanner connected to a computer.

Figure 9:
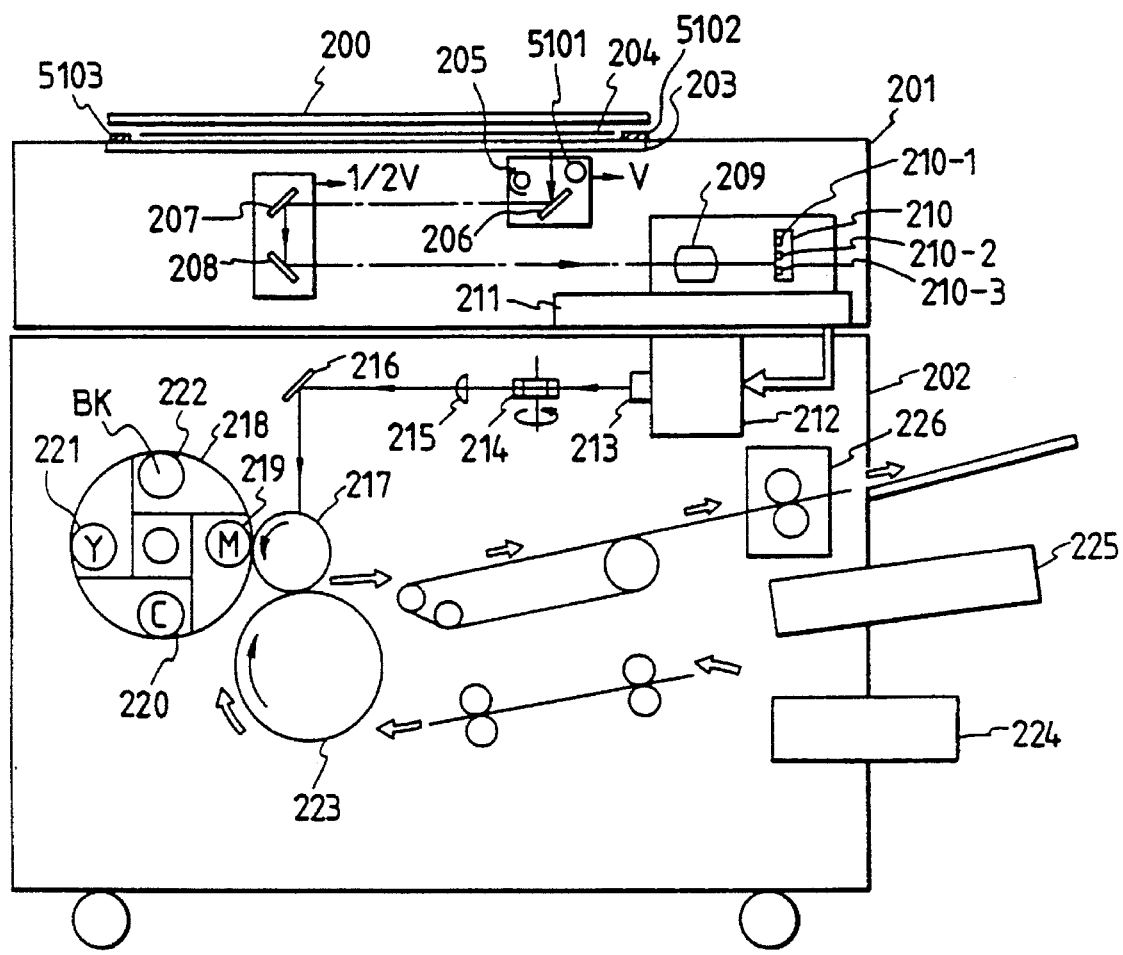
FIG. 9 is a schematic sectional view showing an arrangement of a color copying machine using the first embodiment.

FIG. 9 shows the outer appearance of an apparatus according to the first embodiment of the present invention.

Referring to FIG. 9, an image scanner unit 201 performs an image reading operation, and digital signal processing. A printer unit 202 prints out a full-color image corresponding to an original image read by the image scanner unit 201 on a paper sheet.

Figure 5A:
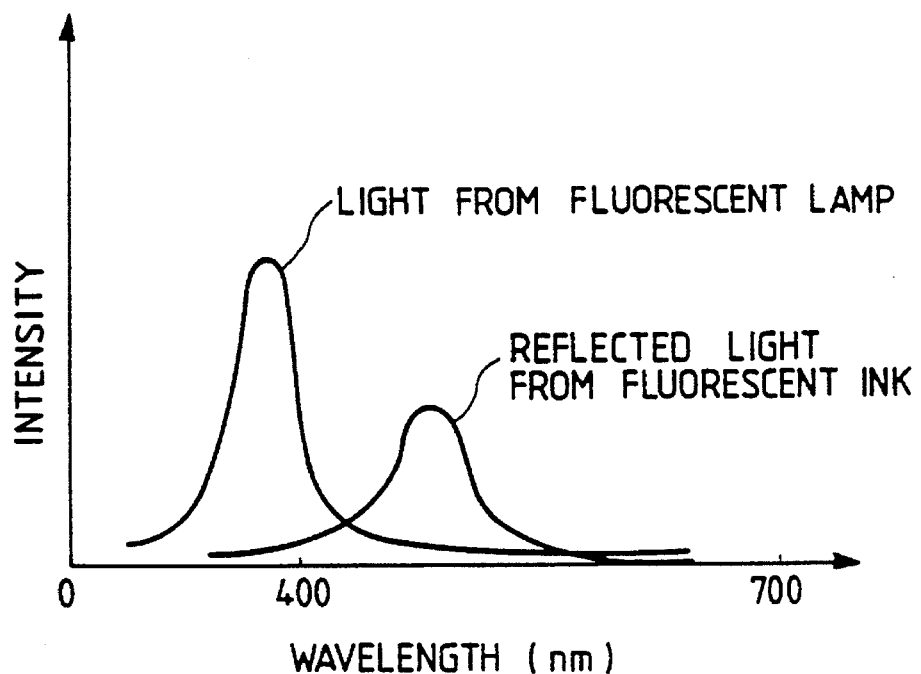
FIGS. 5A and 5B are graphs showing the characteristics of a fluorescent ink of the first embodiment.
Figure 5B:
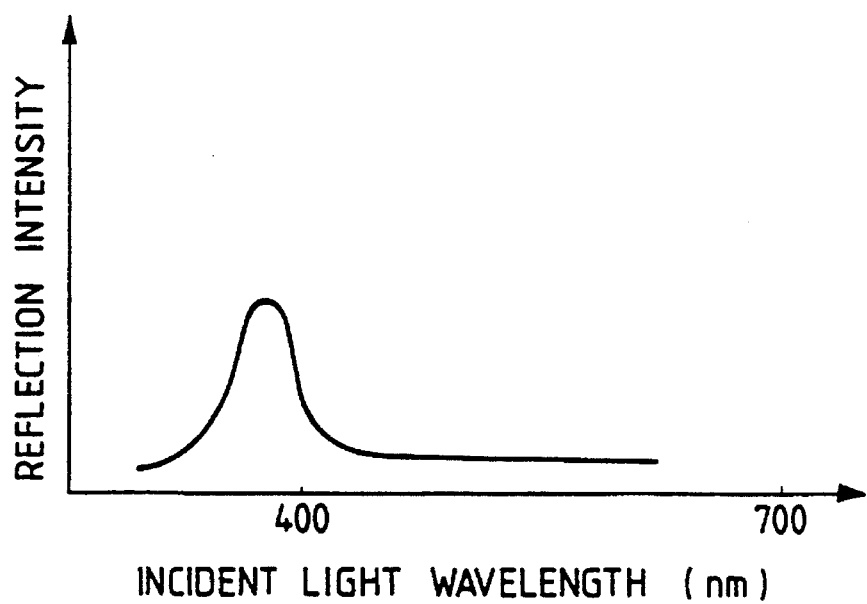

The image scanner unit 201 includes a fluorescent lamp 5101 for emitting light (ultraviolet rays) in a short-wavelength range (wavelength range other than visible light), which light can efficiently excite a normal fluorescent ink. FIG. 5A shows the light-emission spectrum characteristics of the fluorescent lamp 5101, and the reflection spectrum characteristics of the fluorescent ink irradiated with light from the fluorescent lamp 5101. The fluorescent ink has characteristics in that it does not emit fluorescence for light components emitted from a halogen lamp 205. As shown in FIG. 5B, the fluorescent ink is excited by only light of a specific wavelength. A mirror-surface thick plate 200 is arranged on the upper surface of the image scanner unit 201. An original 204 placed on an original table glass (to be referred to as a platen hereinafter) 203 is irradiated with light emitted from the halogen lamp 205 or the fluorescent lamp 5101, and light reflected by the original is guided to reflection mirrors 206, 207, and 208. The light then forms an image on a CCD sensor (to be referred to as a sensor hereinafter) 210 including R, G, and B 3-line CCD sensors via a lens 209, and is then supplied to a signal processing unit 211 as red (R), green (G), and blue (B) components of full-color information. The lamp 205 and the mirror 206 are mechanically moved at a speed V in a direction (to be referred to as a sub-scan direction hereinafter) perpendicular to an electrical scan direction (to be referred to as a main scan direction hereinafter) of the line sensor, and the mirrors 207 and 208 are mechanically moved at a speed ½ V in the sub-scan direction, thereby scanning the entire surface of the original.

A standard white plate 5102 is arranged at a position where it is illuminated with the original illumination means when the original illumination means is located at a reference position (to be referred to as a home position hereinafter), and is separated by the same optical distance from the sensor as that between the sensor and an original on the platen. Data obtained using the plate 5102 is used as correction data for correcting a variation of image data read by the sensor 210 when the halogen lamp 205 is used. A fluorescence reference plate 5103 is arranged at a position opposite to the standard white plate 5102 in the scanning direction of a carriage including the mirror 206. The fluorescence reference plate 5103 is separated by the same optical distance from the sensor as that between the sensor and an original on the platen. The fluorescence reference plate is uniformly coated with a fluorescent ink, which exhibits characteristics almost equivalent to those of the fluorescent ink having the reflection spectrum characteristics shown in FIG. 5A, and data obtained using this plate is used for correcting data output from the sensor 210 when the fluorescent lamp 5101 is used.

The signal processing unit 211 electrically processes the read R, G, and B signals to convert them into magenta (M), cyan (C), yellow (Y), and black (Bk) components, and supplies these components to the printer unit 202. One of M, C, Y, and Bk components is supplied to the printer unit 202 for each original scanning operation of the image scanner unit 201, and a single print-out operation is completed by a total of four original scanning operations.

M, C, Y, and Bk frame-sequential image signals sent from the image scanner unit 201 are supplied to a laser driver 212. The laser driver 212 modulation-drives a semiconductor laser 213 in accordance with the image signals. A laser beam is scanned on the surface of a photosensitive drum 217 via a polygonal mirror 214, an f-θ lens 215, and a mirror 216.

A rotary developing unit 218 includes a magenta developer 219, a cyan developer 220, a yellow developer 221, and a black developer 222, and the four developers alternately contact the photosensitive drum to develop M, C, Y, and Bk electrostatic latent images formed on the photosensitive drum 217 with corresponding toners.

A paper sheet fed from a paper sheet cassette 224 or 225 is wound around a transfer drum 223, and the toner image developed on the photosensitive drum 217 is transferred onto the paper sheet.

In this manner, after the four, i.e., M, C, Y, and Bk color images are sequentially transferred, the paper sheet is exhausted via a fixing unit 226.

Figure 7:
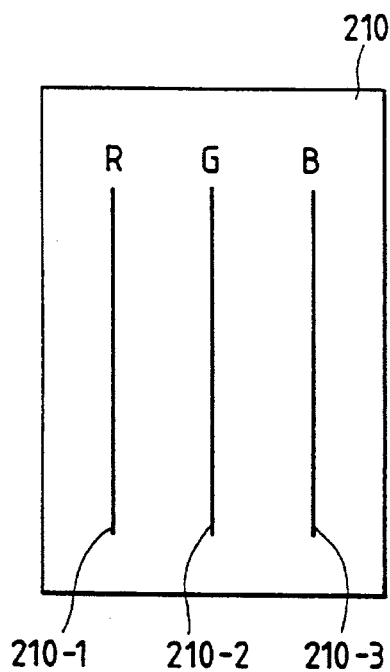
FIG. 7 is a view showing an arrangement of the CCD sensor of the first embodiment.

FIG. 7 shows the arrangement of the CCD sensor 210 used in this embodiment.

The CCD sensor 210 includes light-receiving element arrays (CCD sensors) 210-1, 210-2, and 210-3 for respectively reading R, G, and B wavelength components.

The three light-receiving element arrays having different optical characteristics are monolithically arranged on a single silicon chip, so that the R, G, and B sensors are arranged parallel to each other so as to read the same line.

Figure 6:
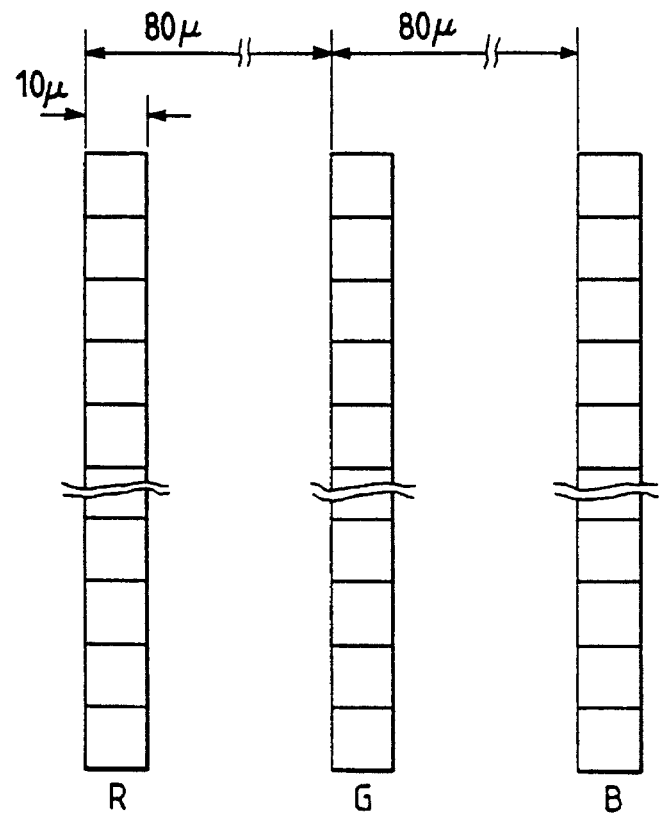
FIG. 6 is an enlarged view of light-receiving elements of a CCD sensor of the first embodiment.

FIG. 6 is an enlarged view of the light-receiving elements. Each sensor has a main-scan length of 10 μm per pixel. Each sensor has 5,000 pixels in the main scan direction to be able to read the widthwise direction (297 mm) of an A3-size original at a resolution of 400 dpi. An inter-line distance between two adjacent ones of the R, G, and B sensors is 80 μm, and these sensors are separated by 8 lines in correspondence with the sub-scan resolution of 400 dpi.

Optical filters are respectively formed on the surfaces of the line sensors so as to obtain predetermined R, G, and B spectrum characteristics.

The spectrum characteristics of the R, G, and B line sensors of the sensor 210 will be described below with reference to FIG. 12. The optical filters are formed on the surfaces of the R, G, and B line sensors to obtain predetermined spectrum characteristics.

Figure 12:
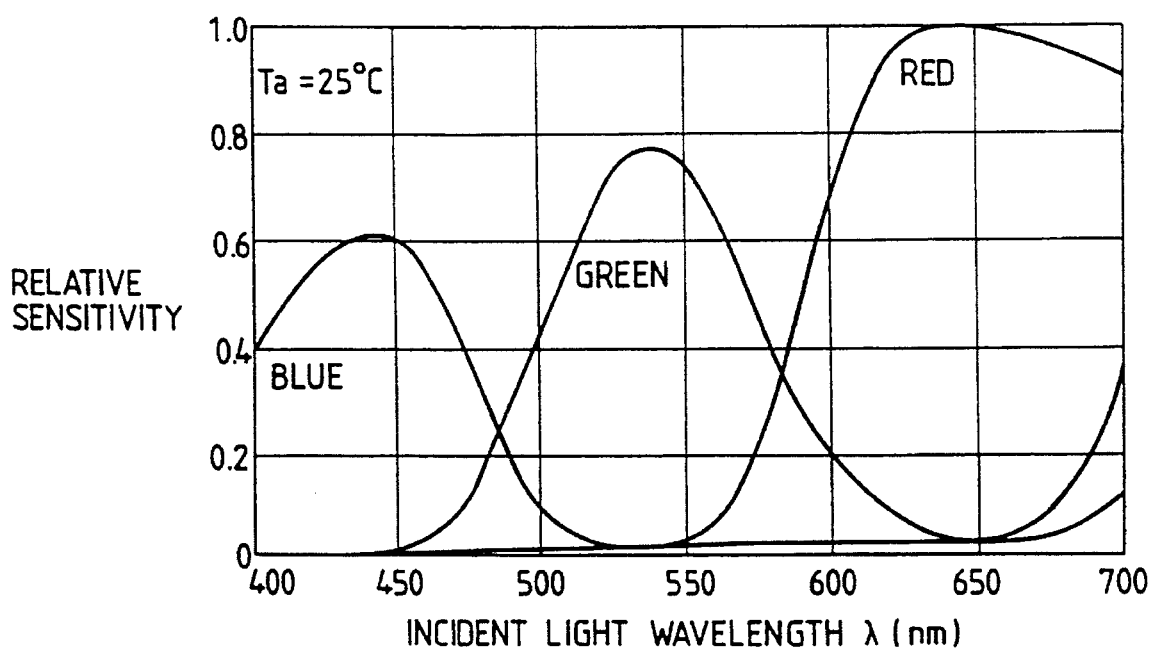
FIG. 12 is a graph showing the spectrum sensitivity of a visible light sensor of the first embodiment.
Figure 13:
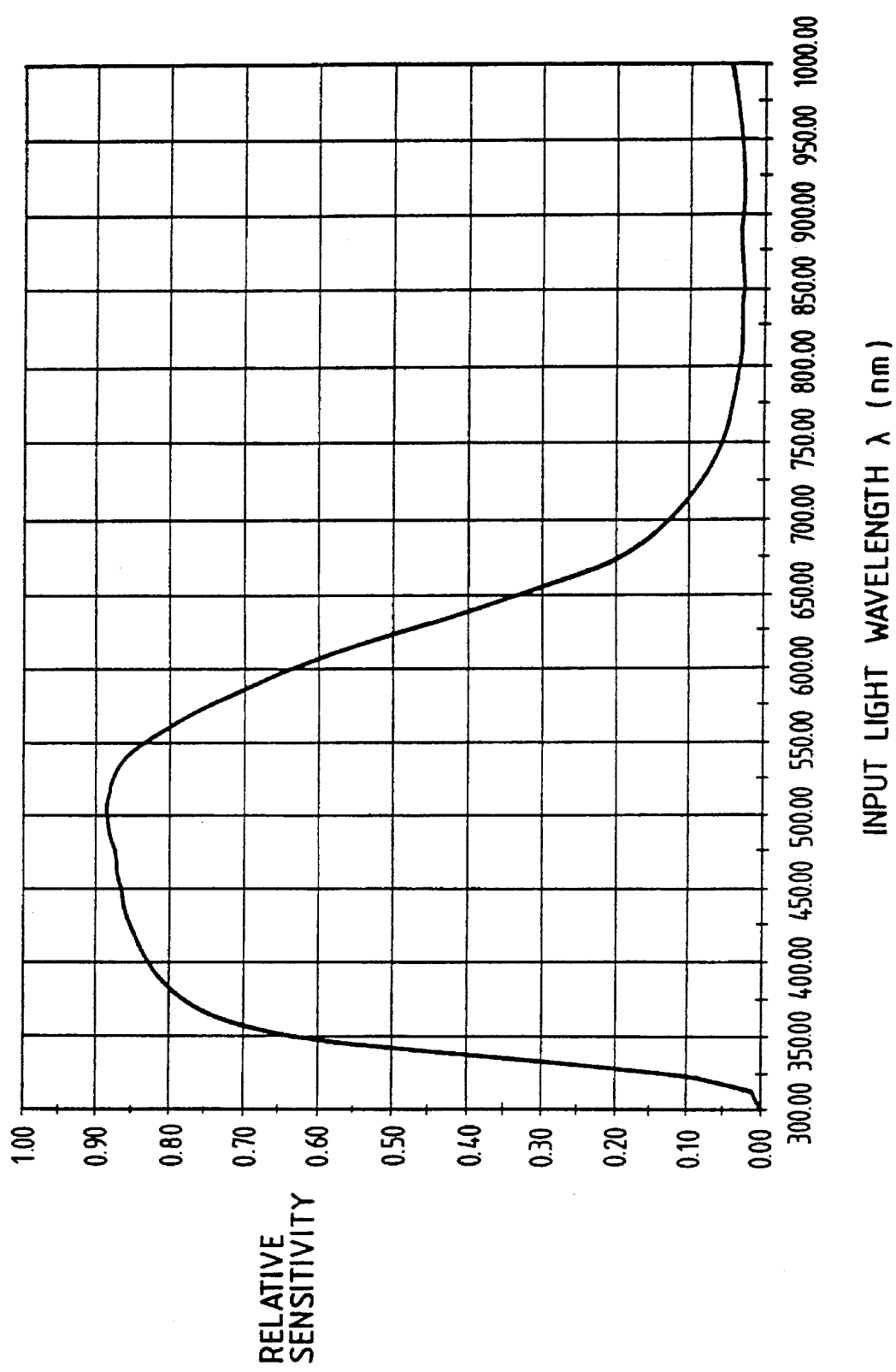
FIG. 13 is a graph showing the spectrum sensitivity of the visible light sensor of the first embodiment.

FIG. 12 shows the characteristics of conventional R, G, and B filters. As can be seen from FIG. 12, since the conventional R, G, and B filters have sensitivity with respect to infrared light of 700 nm or higher, an infrared cut filter shown in FIG. 13 is provided to the lens 209.

FIGS. 1A and 1B are block diagrams showing the flow of image signals in the image scanner unit 201. The image signals output from the CCD sensor 210 are input to an analog signal processing unit 4001, and are converted into 8-bit digital image signals. Thereafter, these digital image signals are input to a shading correction unit 4002.

A decoder 4008 generates CCD driving signals (e.g., shift pulses, reset pulses, and the like) in units of lines by decoding main scan addresses from a main scan address counter 419.

A clock generating circuit 430 outputs predetermined signals to predetermined devices of this embodiment.

A VSYNC signal is an image effective period signal in the sub-scan direction, and is sequentially generated in the image reading (scanning) order, i.e., in the order of (M), (C), (Y), and (Bk). AVE signal is an image effective period signal in the main scan direction, and defines the timing of a main scan start position. A CLK signal is a pixel synchronization signal, and transfers image data at the timing of the leading edge of 0→1. An HSYNC signal is a timing pulse output in synchronism with a reading operation per line of (M), (C), and (Y).

Figure 2:
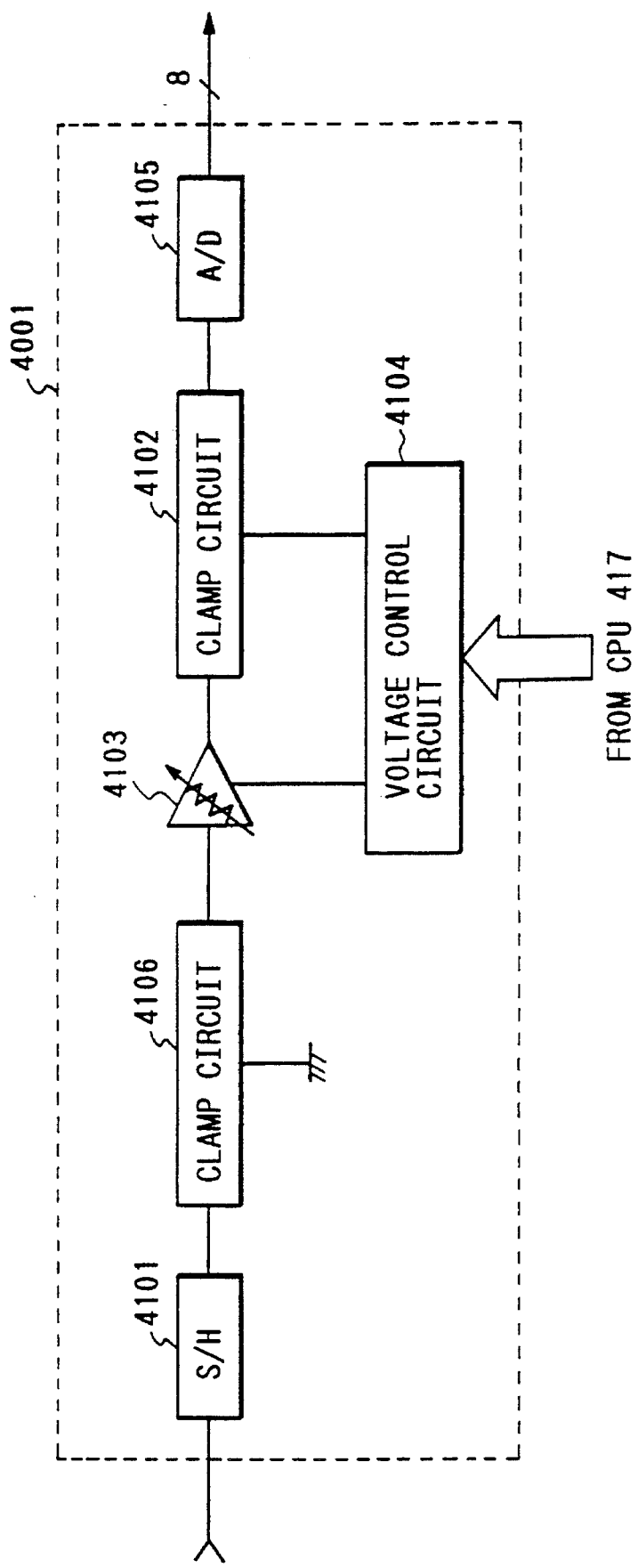
FIG. 2 is a block diagram showing an analog signal processing unit of the first embodiment.

FIG. 2 is a block diagram of the analog signal processing unit 4001. Since the unit 4001 includes the same R, G, and B processing circuits, FIG. 2 shows a circuit for one color. An image signal output from the CCD sensor 210 is sampled and held by a sample & hold (S/H) unit 4101 so as to stabilize an analog signal waveform. A CPU 417 controls a variable amplifier 4103 and a clamp circuit 4102 via a voltage control circuit 4104 so that the image signal can fully utilize the dynamic range of an A/D converter 4105. The A/D converter 4105 converts an analog image signal into an 8-bit digital image signal.

The 8-bit digital image signal is subjected to shading correction by a known shading correction means in the shading correction unit 4002.

When the fluorescent lamp 5101 is used, the CPU stores a fluorescence signal for one line read from the fluorescence reference plate 5103 in corresponding line memories 4003 in correspondence with the read signal from the sensor 210, calculates multiplication coefficients for converting read data of pixels stored in the line memories into 255 levels in units of pixels, and stores these coefficients in coefficient memories 4006 for one line. When an actual original is read, the CPU reads out the multiplication coefficients corresponding to output pixels in synchronism with the pixel signals of a line read by the sensor 210, and causes multiplication devices (to be referred to as multipliers hereinafter) 4007 to multiply the pixel signals from the sensor 210 with the multiplication coefficients, thereby achieving shading correction.

Shading correction upon using the halogen lamp 205 is performed in the same manner as that upon using the fluorescent lamp 5101. That is, a read signal for one line from the standard white plate 5102 is stored in the line memories, multiplication coefficients for converting pixel values of the stored signal into 255 levels are stored in the coefficient memories, and the read signal is multiplied with the multiplication coefficients in units of pixels from the coefficient memories by the multipliers.

As shown in FIG. 6, since the light-receiving units (light-receiving element arrays) 210-1, 210-2, and 210-3 are arranged to be separated by a predetermined distance, spatial shifts in the sub-scan direction among these light-receiving units are corrected by delay elements 401 and 402. More specifically, R and G signals obtained by reading an original prior to a B signal in the sub-scan direction are delayed in the sub-scan direction to be synchronized with the B signal. Log converters 403, 404, and 405 comprise look-up table ROMs, and respectively convert luminance signals into density signals. A known masking and UCR circuit 406 (a detailed description thereof will be omitted) outputs Y, M, C, and Bk signals each having a predetermined bit length (e.g., 8 bits) in accordance with input three primary color signals every time a reading operation is performed.

A counter 20101 counts the number of fluorescent pixels from an original in synchronism with the clocks CLK. In this embodiment, an 8-bit counter is used, and accumulates a maximum of 255 fluorescent pixels.

A detection circuit 4009 discriminates based on 8-bit R, G, and B signals whether or not each pixel is a fluorescent pixel. Since a fluorescent mark used in this embodiment has reflection spectrum characteristics shown in FIG. 5A, the detection circuit determines a fluorescent pixel when the value of a G signal is equal to or greater than 80H.

A 4-input AND gate 20102 supplies a binary fluorescence signal output from the detection circuit 4009 as an enable signal of the counter 20101 when the main scan effective period signal VE and the sub-scan effective period signal VSYNC are generated.

The counter 20101 is cleared to "0" in response to a CLR signal from the CPU. In response to this clear signal, a flip-flop (F/F) 20103 is set, and enables an output from the gate 20102.

When a binary signal is input beyond the maximum count value "255" of the counter 20101, the counter 20101 generates an RC signal when the output from the counter 20101 has reached "255", the F/F 20103 is reset in response to the RC signal, and an enable input of the counter is forcibly set to be "0", thereby holding the counter output to be "255".

The CPU 417 reads the count result of the counter 20101 as a CNT signal. When the count result is equal to or larger than a predetermined value (e.g., equal to or larger than 128 pixels), the CPU detects that a copy-inhibited original is placed on the platen.

A means for acquiring information of only the fluorescent ink of an original will be described below.

As can be seen from FIG. 12, the sensor 210 has no sensitivity in a wavelength range of 400 nm or below. Referring to FIG. 5A, since the fluorescent lamp 5101 has a very small light amount in a wavelength range of 400 nm or above, when an original without any fluorescent ink is illuminated with light from the fluorescent lamp 5101, the sensor 210 detects almost no signals. However, when an original with the fluorescent ink is illuminated with light from the fluorescent lamp 5101, the sensor 210 can detect fluorescence of the fluorescent ink within its sensitivity range. When the fluorescent lamp has a sufficient light amount in a light wavelength range which can be detected by the sensor, light in the light wavelength range which can be detected by the sensor becomes noise in data detection of the fluorescent ink. In order to achieve stable detection in processing for detecting a fluorescent mark, an S/N ratio as high as 2 or more is required. Since the reflected light amount from the fluorescent ink with respect to the incident light amount upon fluorescence of the fluorescent ink is 50% in the worst case, a fluorescent lamp, whose fluorescent lamp light amount in a range wherein the sensor has effective sensitivity is at least ¼ or less of the incident light intensity at a wavelength at which the fluorescent ink is excited, is used.

When information of the fluorescent ink is acquired by turning on the fluorescent lamp 5101, the halogen lamp 205 is turned off so as to reliably detect information of only the fluorescent ink. Alternatively, the light amount of the halogen lamp 205 is decreased to a level which does not influence the information acquisition to obtain a similar effect, and at the same time, a decrease in temperature of the lamp can be prevented in this case. Conversely, when image data is acquired by turning on the halogen lamp 205, if the fluorescent lamp 5101 is kept ON, since the fluorescent ink emits fluorescence, and image data having a color tone different from that of an original may be acquired, or an original or the standard white plate may deteriorate, the fluorescent lamp 5101 is turned off to avoid the above-mentioned problems. Alternatively, the light amount of the fluorescent lamp is decreased to a level which does not influence the image data acquisition to obtain a similar effect, and at the same time, a decrease in lamp temperature can be prevented in this case.

Figure 3B:
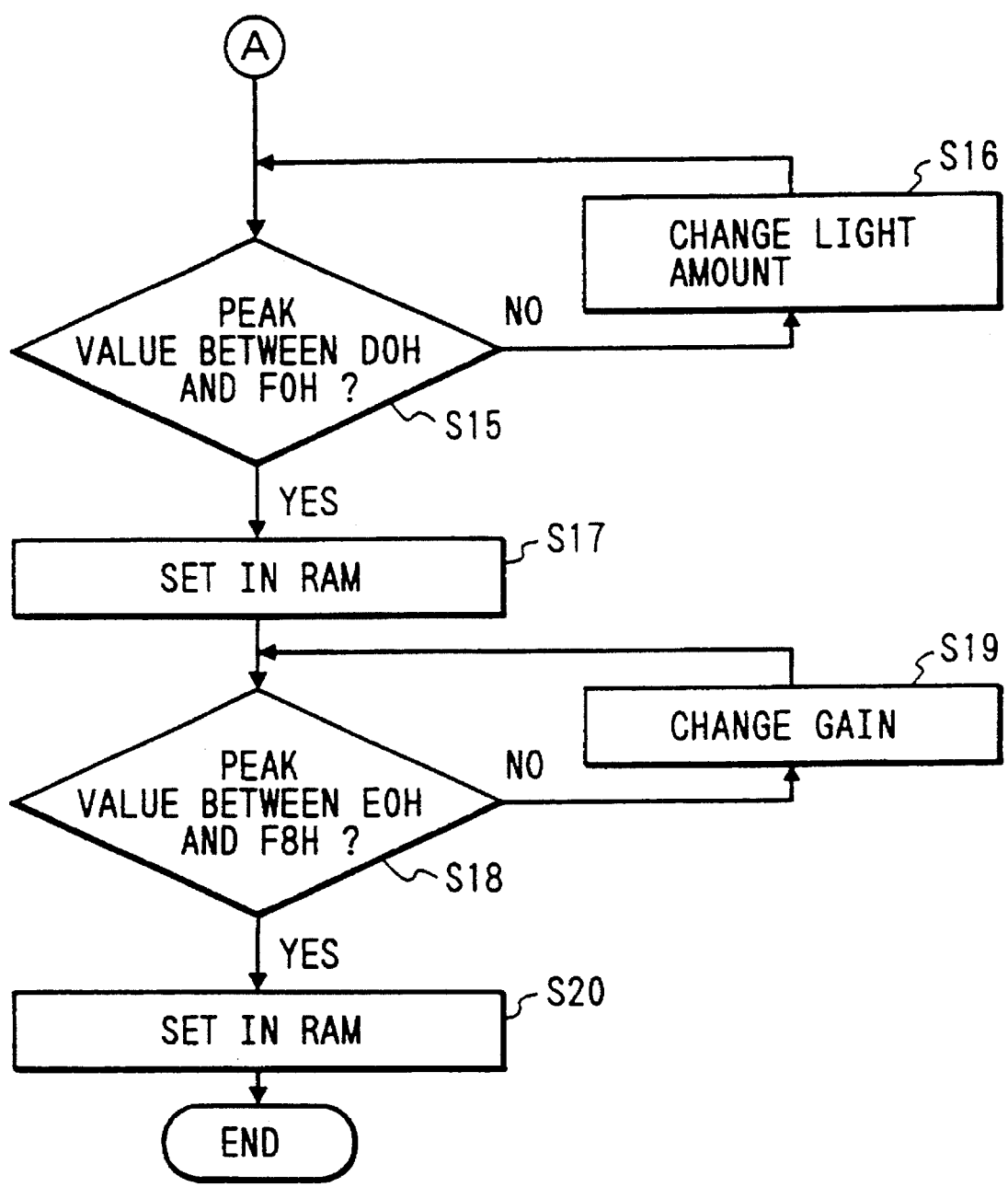
FIG. 3 is comprised of FIG. 3A and FIG. 3B showing flow charts of light amount adjustment/circuit gain control of the first embodiment.

The light amount adjustment method of the halogen lamp 205 and the fluorescent lamp 5101, and the control method of the variable amplifiers 4103 and the clamp circuits 4102 will be described below with reference to the flow chart shown in FIGS. 3A and 3B. Since the amount of light reflected by the fluorescent ink using the fluorescent lamp is very small, the gain of the variable amplifier is changed in correspondence with which of the halogen lamp and the fluorescent lamp is used.

Figure 4:
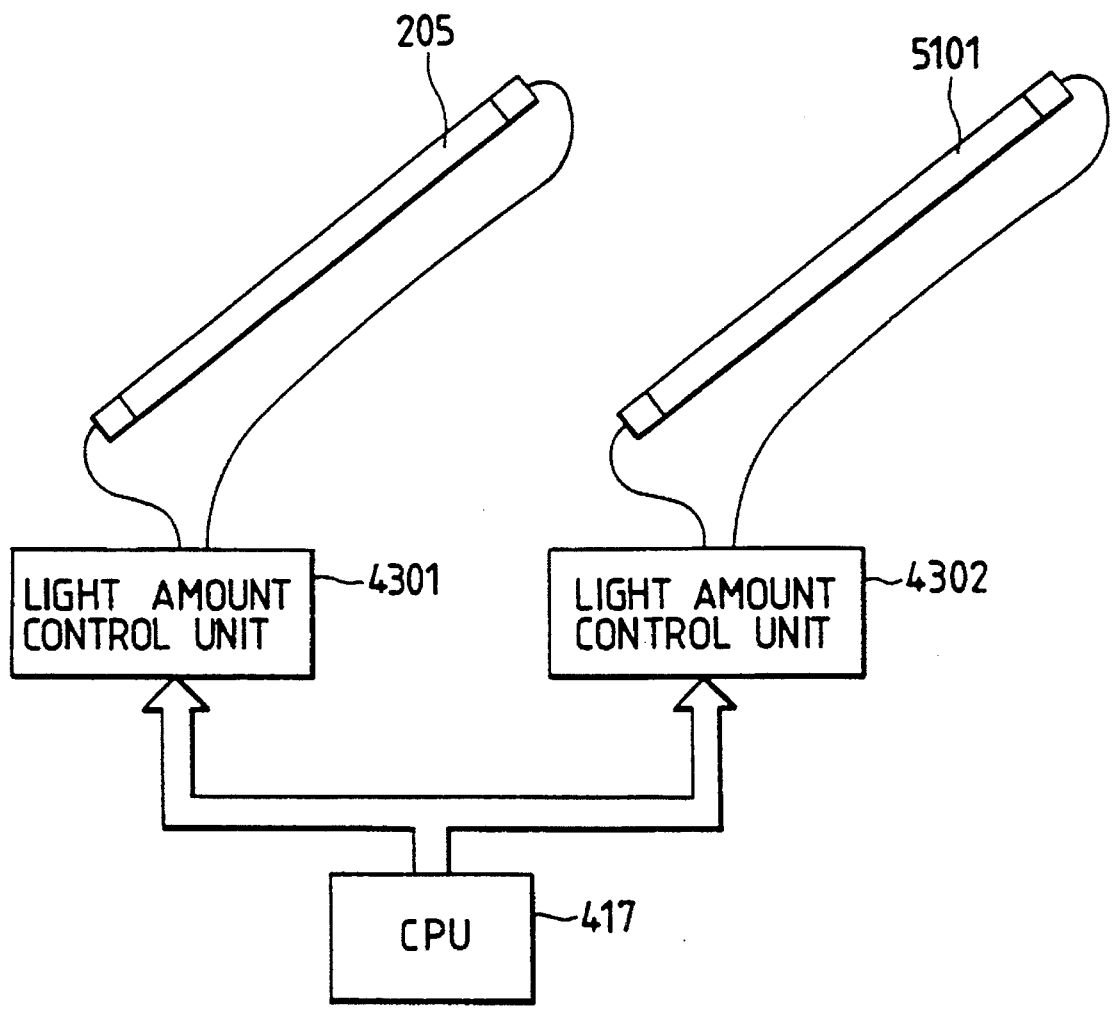
FIG. 4 is a block diagram showing light amount control blocks of an original illumination lamp.

FIG. 4 is a block diagram of light amount control units 4301 and 4302 of the halogen lamp 205 and the fluorescent lamp 5101. In the analog signal processing unit 4001, in order to fully utilize the dynamic ranges of the A/D converters 4105, the gains of the variable amplifiers 4103 are adjusted on the basis of image data obtained upon reading of the standard white plate 5102, and the control voltages of the clamp circuits 4102 are adjusted by the corresponding voltage control circuits 4104 on the basis of image data obtained when no light is radiated on the sensor 210.

When an adjustment mode is started by an operation unit (not shown), the reflection mirror 206 is moved to a position below the standard white plate 5102, and a predetermined gain for the halogen lamp is set in each variable amplifier 4103 (step 1). Image data obtained when no light is radiated on the CCD sensor 210 is stored in the line memories (shading RAMs) 4003. The CPU 417 calculates an average value of the stored image data for one line, and controls the voltage control circuits 4104 so that the average value of the image data for one line becomes closest to 08H, thereby adjusting the reference voltages of the clamp circuits 4102 (steps 2 and 3). The adjusted control value is stored in a RAM 418 connected to the CPU 417 (step 4).

Then, the halogen lamp 205 is turned on, and image data obtained upon reading of the standard white plate 5102 are stored in the line memories 4003. The CPU 417 controls the light amount control unit 4301, so that the peak value of a G signal falls within a range from D0H to F0H (steps 5 and 6; halogen lamp adjustment). The CPU stores the adjusted control value in the RAM 418 connected to the CPU 417 (step 7). Then, the halogen lamp 205 is turned on to have the light amount adjusted in steps 5 and 6, and R, G, and B image data obtained upon reading of the standard white plate 5102 are stored in the corresponding line memories 4003. Then, the voltage control circuits 4104 are controlled, so that the peak values of R, G, and B image data fall within a range from E0H to F8H, thereby adjusting the gains of the variable amplifiers 4103 in correspondence with R, G, and B colors (steps 8 and 9). The adjusted gains are stored as gain data (to be referred to as H-gain data hereinafter) corresponding to the halogen lamp 205 in the RAM 418 connected to the CPU 417. Thereafter, the halogen lamp 205 is turned off (step 10).

In order to adjust the light amount of the fluorescent lamp 5101, the reflection mirror 206 is moved to a position below the fluorescence reference plate 5103, and a predetermined gain for the fluorescent lamp is set in each variable amplifier 4103 (step 11). Image data obtained when no light is radiated on the CCD 210 are stored in the line memories 4003. The CPU 417 calculates an average value of the stored image data for one line, and controls the voltage control circuits 4104 so that the average value of the image data for one line becomes closest to 08H, thereby adjusting the reference voltages of the clamp circuits 4102 (steps 12 and 13). The adjusted control value is stored in the RAM 418 connected to the CPU 417 (step 14).

Then, the fluorescent lamp 5101 is turned on, and image data obtained upon reading of the fluorescence reference plate 5103 are stored in the line memories 4003. The CPU 417 controls the light amount control unit 4302, so that the peak value of the G signal falls within a range from D0H to F0H (steps 15 and 16; fluorescent lamp adjustment), and the adjusted value is stored in the RAM 418 connected to the CPU 417 (step 17). Then, the fluorescent lamp 5101 is turned on to have the light amount adjusted in step 17, and image data obtained upon reading of the fluorescence reference plate 5103 are stored in the shading RAMs 4003. The voltage control circuits 4103 are controlled, so that the peak values of R, G, and B image data fall within a range from E0H to F8H, thereby adjusting the gains of the variable amplifiers 4103 in units of R, G, and B colors (steps 18 and 19). The adjusted gains are stored as gain data (to be referred to as UV-gain data hereinafter) corresponding to the fluorescent lamp 5101 in the RAM 418 connected to the CPU 417. Thereafter, the fluorescent lamp 5101 is turned off (step 20).

In this embodiment, the presence/absence of the fluorescent ink in a copy-inhibited original is detected.

In some copy-inhibited originals such as paper money, a fluorescent material with fluorescent characteristics is mixed in paper fibers of paper money like in Canadian dollar bills.

In this embodiment, a fluorescent mark is detected from thin line information such as a fiber having reflection spectrum characteristics shown in FIG. 5A as an example of such a fiber, thereby detecting a copy-inhibited original. In this embodiment, the number of pixels of fluorescent information included in an original is counted, and when the count value is equal to or larger than a predetermined value, it is determined that an original is a copy-inhibited original.

Figure 8:
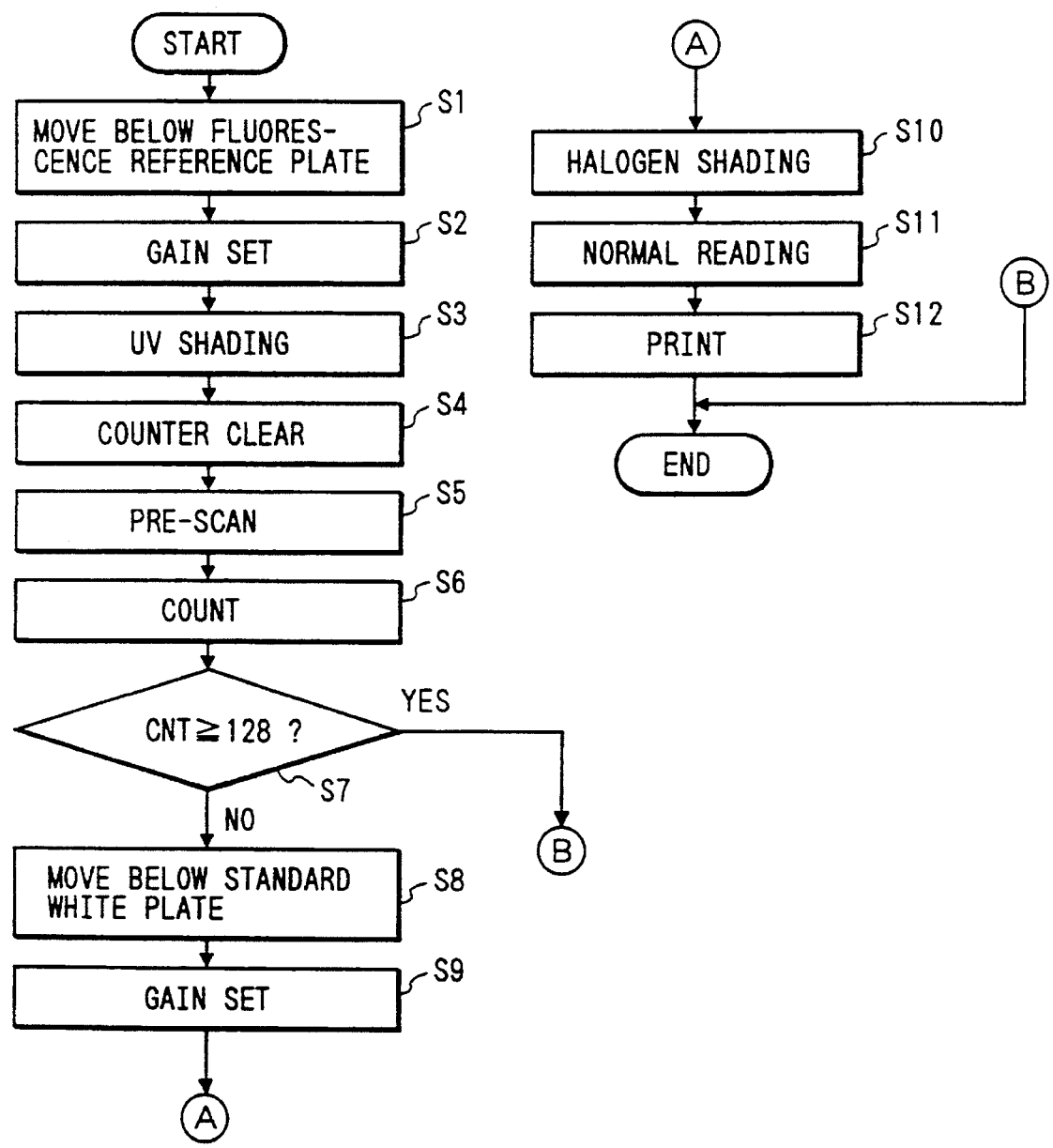
FIG. 8 is a flow chart for explaining the first embodiment.

The actual operation will be described below with reference to the flow chart shown in FIG. 8.

When an operator sets an original on the platen 203, and starts a copying operation using an operation unit (not shown), the CPU 417 controls a motor (not shown) to move the reflection mirror 206 to a position below the fluorescence reference plate 5103 (step 1). Then, the UV-gain data are set in the corresponding variable amplifiers 4103 via the voltage control circuits 4104 of the analog signal processing unit 4001 (step 2). The fluorescent lamp 5101 is turned on based on the control value set in the fluorescent lamp adjustment to illuminate the fluorescence reference plate 5103. In the shading correction unit 4002, shading data corresponding to the fluorescent lamp 5101 are stored in the corresponding line memories 4003, and known shading correction is executed (step 3). In step 4, the CPU 417 clears the counter 20101 and the F/F 20103. The original reading operation is performed (step 5; pre-scan), and the detection circuit 4009 counts the number of fluorescent pixels on the original 204 (step 6). It is then checked if the number of fluorescent pixels is equal to or larger than a predetermined value (in this case, 128) (step 7).

If it is determined in step 7 that the number of fluorescent pixels is equal to or larger than the predetermined value, it is determined that the original 204 is a copy-inhibited original, and the copying operation ends.

If it is determined in step 7 that the number of fluorescent pixels is smaller than the predetermined value, i.e., if it is determined that the original 204 is not a copy-inhibited original, the reflection mirror 206 is moved to a position below the standard white plate 5102 (step 8), and the H-gain data are set in the corresponding variable amplifiers 4103 (step 9). The halogen lamp 205 is turned on based on the control value set in the halogen lamp adjustment to illuminate the standard white plate 5102. In the shading correction unit, shading data corresponding to the halogen lamp 205 are stored again in the line memories 4003, and known shading correction is executed (step 10). Then, a total of four normal reading operations are performed in correspondence with M, C, Y, and Bk colors (step 11), and the printer unit 202 executes an image formation operation (step 12), thus ending the copying operation.

All the above-mentioned control operations are executed by the CPU 417. When light emitted from the halogen lamp 205 includes a wavelength component which excites the fluorescent ink, a filter for cutting the wavelength component which excites the fluorescent ink may be arranged between the halogen lamp 205 and the original 204.

Second Embodiment

Figure 10:
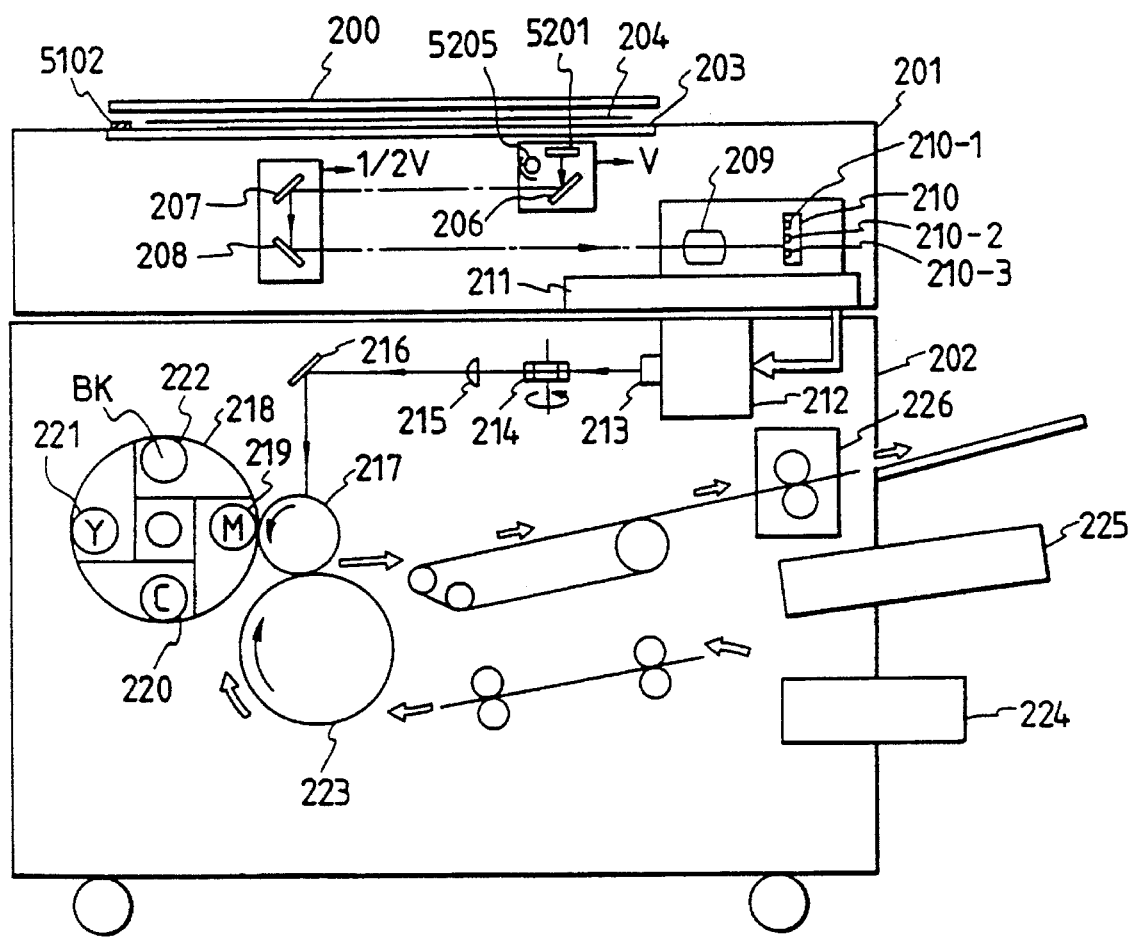
FIG. 10 is a schematic sectional view showing an arrangement of a color copying machine using the second embodiment.
Figure 14:
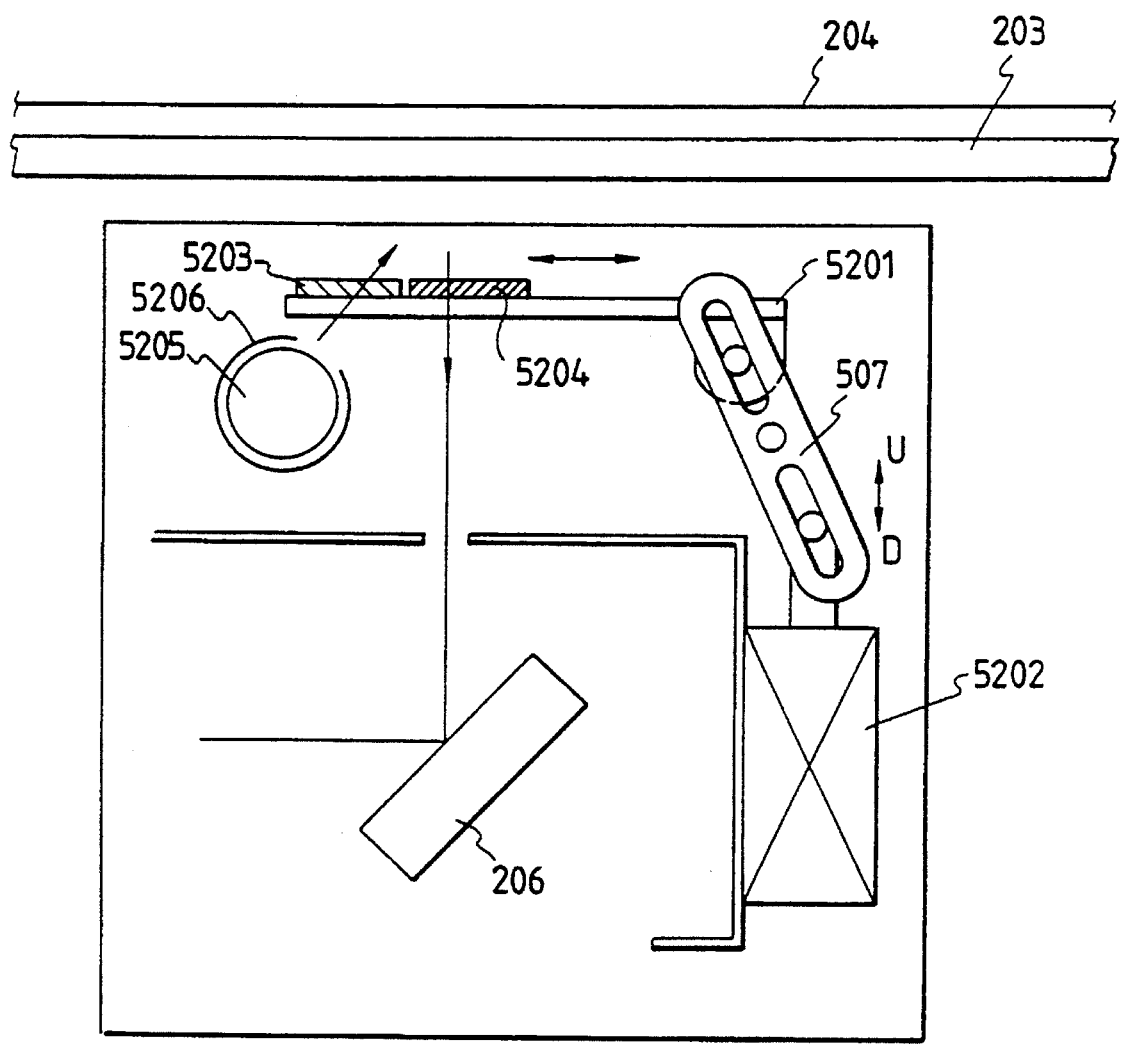
FIG. 14 is a schematic sectional view showing an original illumination unit of an original reading apparatus using the second embodiment.

FIG. 10 is a schematic sectional view showing a copying apparatus according to the second embodiment, and FIG. 14 is a schematic sectional view showing an original illumination unit of the copying apparatus of the second embodiment. In the second embodiment, the number of illumination light sources is decreased from two to one, and the light wavelength range upon illumination of an original is changed by switching filters inserted in the optical path between the light source and an original in addition to the features of the first embodiment.

Figure 15A:
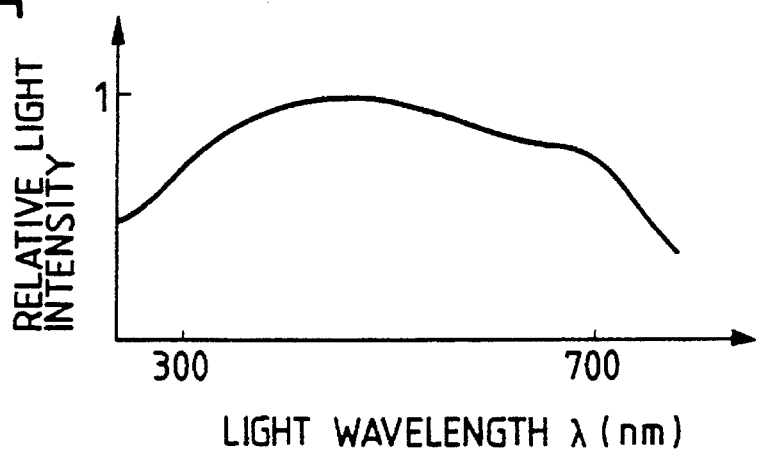
FIGS. 15A, 15B, and 15C are graphs showing the spectrum characteristics of an original illumination lamp, and the spectrum sensitivity characteristics of optical filters in the second embodiment.
Figure 15B:
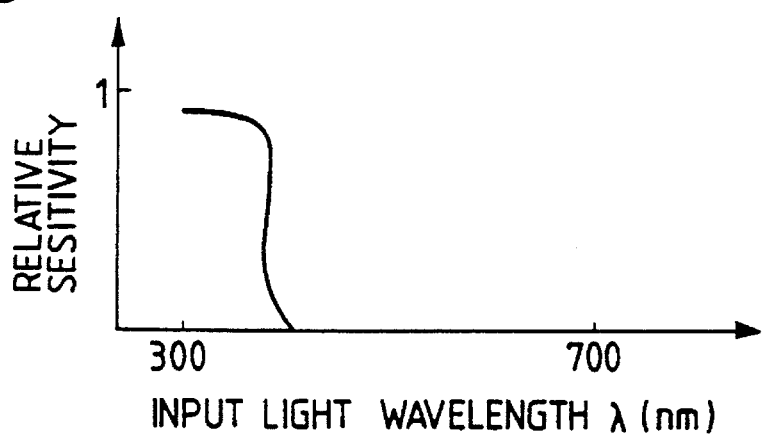

Referring to FIG. 14, a fluorescent lamp 5205 exhibits spectrum characteristics shown in FIG. 15A, and its illumination direction is limited by a light-shielding cover 5206. A visible light cut filter 5203 exhibits characteristics shown in FIG. 15B. An ultraviolet cut filter 5204 exhibits characteristics shown in FIG. 15C. These two filters are mounted on a base 5201 having a glass plate portion, and the base 5201 is moved by a solenoid 5202 in a direction parallel to the platen 203. FIG. 14 shows an arrangement when the solenoid 5202 is located at a position "D", and ultraviolet rays are to be radiated onto an original. In this arrangement, radiation light from the fluorescent lamp 5205 is filtered through the visible light cut filter 5203, and only ultraviolet rays are radiated on an original. Light reflected by the original is filtered through the ultraviolet cut filter 5204, and light excluding ultraviolet rays is guided toward the sensor via the reflection mirror 206. When normal full-color data is to be read, the solenoid 5202 moves to the "U" side, radiation light from the fluorescent lamp 5205 is filtered through the ultraviolet cut filter 5204, and light excluding visible light is radiated onto an original. Light reflected by the original is guided to the sensor via the reflection mirror 206. In the second embodiment, since a common light source is used, data correction of the sensor 210 upon illumination of an original is achieved by multiplying correction means of the sensor 210 obtained using the standard white plate 5102 upon illumination of an original with visible light with coefficients obtained based on experimental data. As shown in FIG. 10, the filters used in this embodiment have a film shape, and do not influence the optical path length of an original reading system.

Third Embodiment

Figure 16:
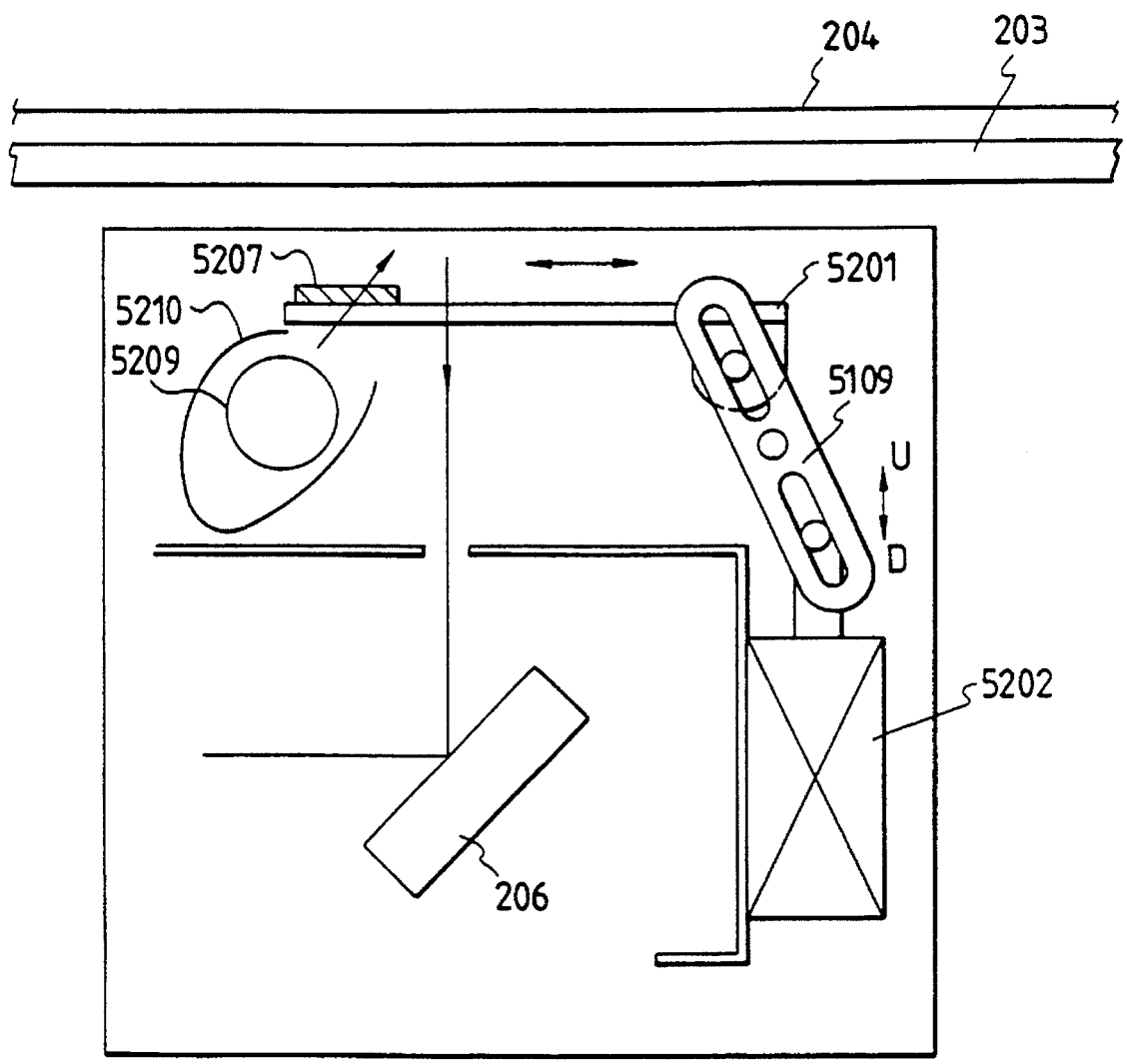
FIG. 16 is a schematic sectional view showing an original illumination unit of an original reading apparatus using the third embodiment.

FIG. 16 is a schematic sectional view of an original illumination unit of an image forming apparatus according to the third embodiment. In the third embodiment, the excitation wavelength of a fluorescent material as an object to be detected is present within a visible light wavelength range in addition to the features of the second embodiment.

Figure 17A:
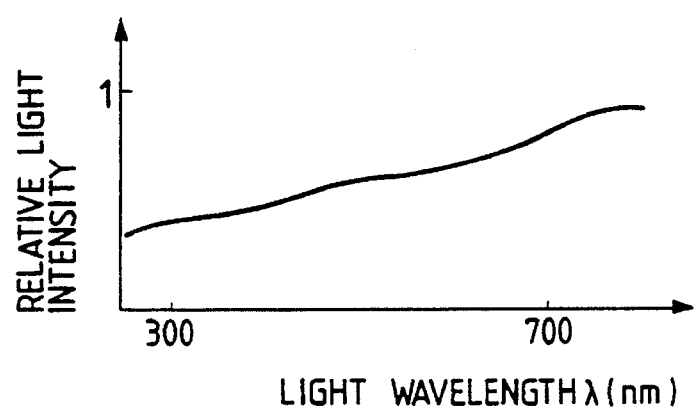
FIGS. 17A, 17B, and 17C are graphs respectively showing the spectral characteristics of an original illumination lamp, the spectral sensitivity characteristics of optical filters, and the optical characteristics of a fluorescent material in the fourth embodiment.
Figure 17B:
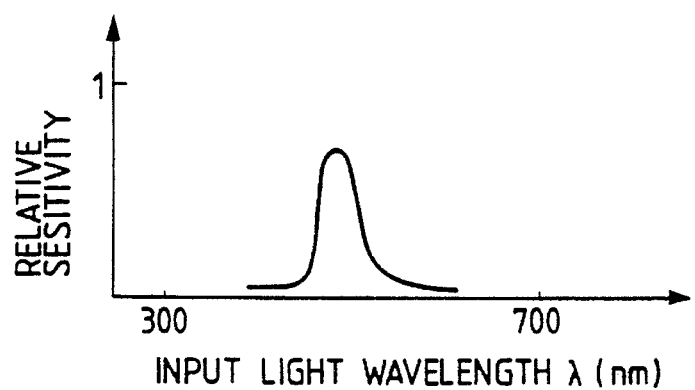
Figure 17C:
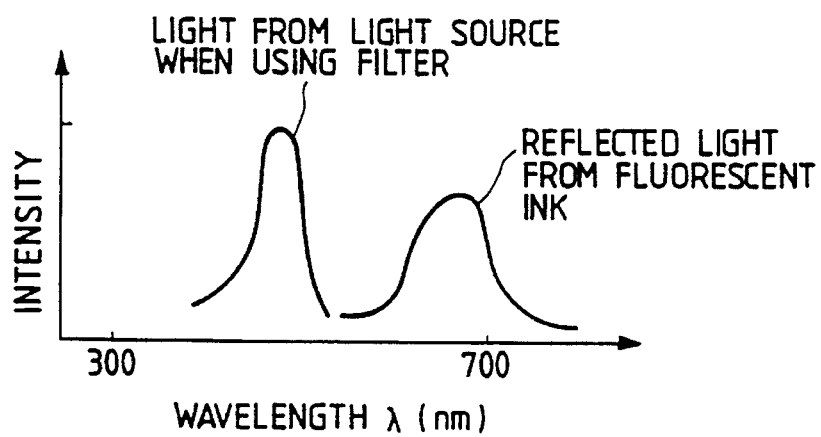

Referring to FIG. 16, a halogen lamp 5209 exhibits spectrum characteristics shown in FIG. 17A, and its focusing and illumination directions are limited by a reflector 5210. A filter 5207 allows only light of the excitation wavelength of the fluorescent material to pass therethrough, and exhibits characteristics shown in FIG. 17B. This filter is mounted on the base 5201, and the base 5201 is moved by the solenoid 5202 in a direction parallel to the platen 203, as in the second embodiment. FIG. 16 shows an arrangement in which the solenoid 5202 is located at a position "D", and the fluorescent material is to be detected. At this time, radiation light from the halogen lamp 5209 is filtered through the filter 5207, and only light of a specific wavelength is radiated onto an original. Light reflected by the original is guided to the sensor via the reflection mirror 206. FIG. 17C shows the spectrum light amount of reflected light of the fluorescent material used in the third embodiment with respect to the spectrum light amount of the specific wavelength illumination means. In the third embodiment, a CCD which exhibits the spectrum sensitivity shown in FIG. 12 as in the first embodiment is used. The fluorescent material is detected as follows. That is, in original scanning, pixel data is binarized based on whether R pixel data from the sensor is equal to or larger than A0H, and when the number of pixels equal to or larger than A0H obtained by adding the binary pixel data exceeds 255, it is determined that an original is a copy-inhibited original, thus ending the copying operation as in the first embodiment.

If it is determined that an original is not a copy-inhibited original, the solenoid 5202 moves to the "U" side, and radiation light from the halogen lamp 5209 is radiated onto an original without going through the filter. Light reflected by the original is guided to the sensor via the reflection mirror 206. Note that the filter used in this embodiment has a film shape, and does not influence the optical path length of an original reading system. When light emitted from the halogen lamp 5209 is radiated onto the fluorescent material without going through the filter 5207, since the amount of the excited visible fluorescence is considerably smaller than that of visible light reflected by the original, no problem of a shift in color tone of full-color image data is not posed.

Fourth Embodiment

Figure 18:
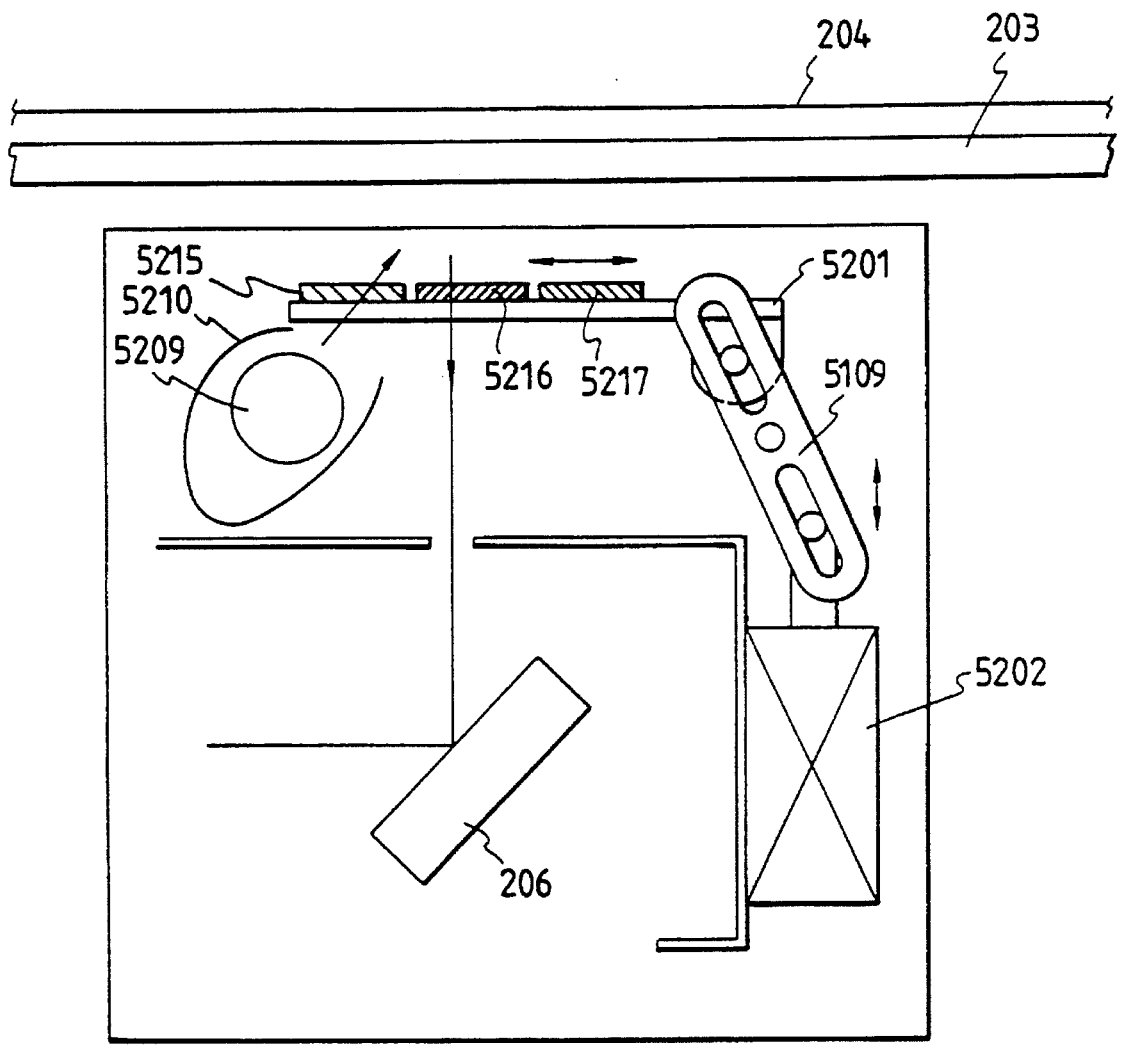
FIG. 18 is a schematic sectional view showing an original illumination unit of an original reading apparatus using the fourth embodiment.
Figure 19:
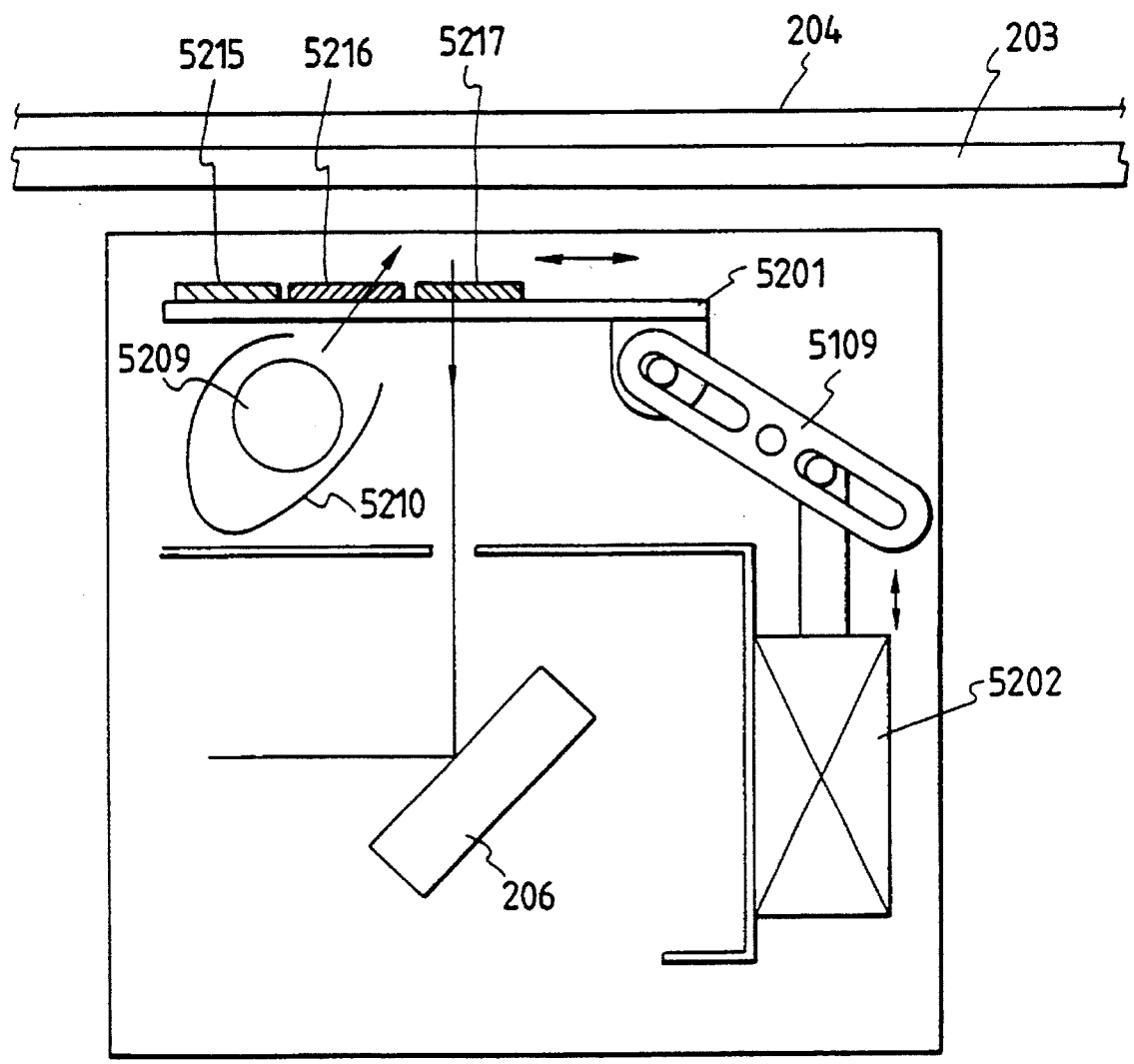
FIG. 19 is a schematic sectional view showing the original illumination unit of the original reading apparatus using the fourth embodiment.

FIGS. 18 and 19 are schematic sectional views of an original illumination unit of an image forming apparatus according to the fourth embodiment. In the fourth embodiment, the excitation wavelength of a fluorescent material to be detected is present within an infrared wavelength range in addition to the features of the second embodiment.

Figure 20A:
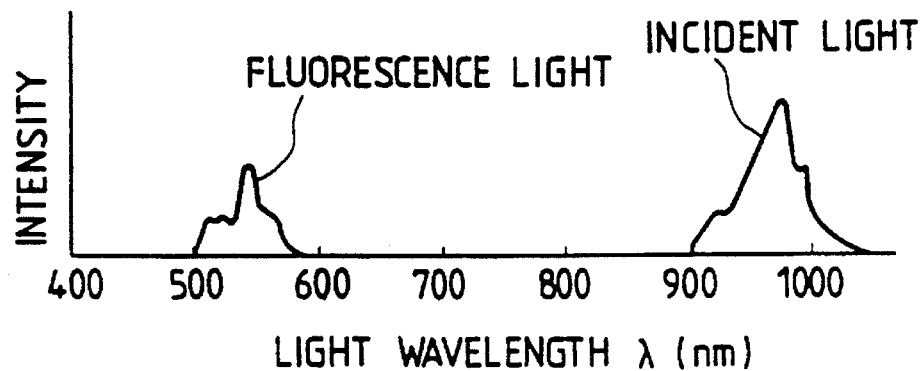
FIGS. 20A, 20B, and 20C are graphs respectively showing the spectrum sensitivity characteristics of optical filters and the optical characteristics of a fluorescent material in the fourth embodiment.
Figure 20B:
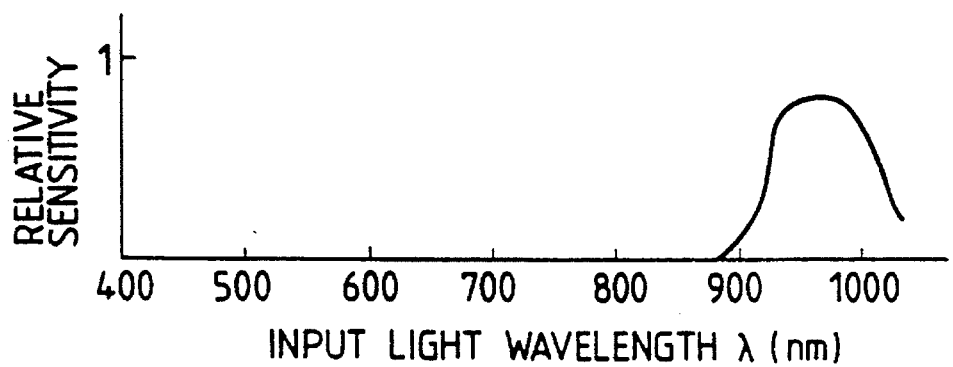
Figure 20C:
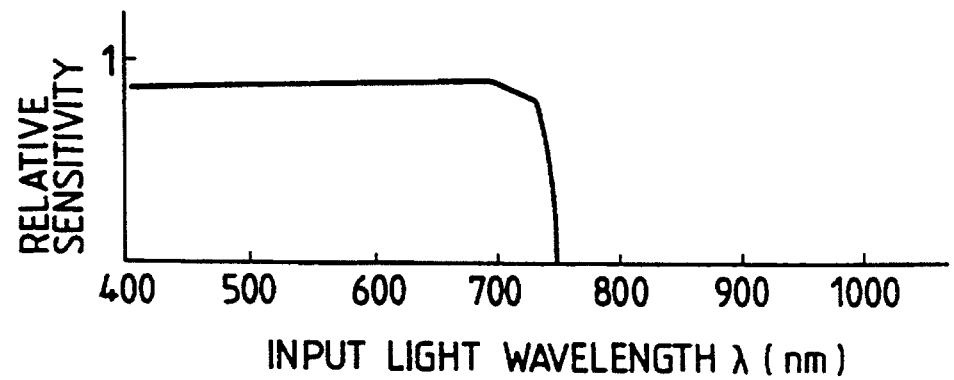

The fourth embodiment will be described below as in the second and third embodiments. A fluorescent material as an object to be detected in the fourth embodiment is based on multi-stage energy transmission, and more specifically, is a fluorescent compound of $BaY_{1.34}Yb_{0.60}Er_{0.06}F_8$. FIG. 20A shows the light-emission spectrum of fluorescence excited light of a fluorescent material of this embodiment with respect to incident light. A halogen lamp 5209 in FIG. 18 has spectrum characteristics shown in FIG. 17A, and its focusing and illumination directions are limited by a reflector 5210. FIG. 20B shows spectrum characteristics of a filter 5215 which allows only light of the excitation wavelength of the fluorescent material to pass therethrough. An infrared cut filter 5216 limits light of a wavelength equal to or higher than 750 nm, and FIG. 20C shows its characteristics. A glass 5217 has the same optical distance as those of the two filters. These components 5215 to 527 are mounted on the base 5201 as in the second embodiment, and the base 5201 is moved by the solenoid 5202 in a direction parallel to the platen 203. FIG. 18 shows an arrangement upon detection of the fluorescent material. At this time, radiation light from the halogen lamp 5209 is filtered through the filter 5215, and only light of a specific wavelength, i.e., having 950 nm as a peak wavelength, is radiated onto an original. Light reflected by the original is filtered through the infrared cut filter 5216, and light of only wavelength components equal to or lower than 750 nm is guided to the sensor via the reflection mirror 206. In the fourth embodiment, a CCD which exhibits the spectrum sensitivity shown in FIG. 12 as in the first embodiment is used. The fluorescent material to be detected is detected as follows. That is, as can be seen from FIG. 20A, the spectrum characteristics of fluorescence have a peak in, particularly, a G signal of the spectrum sensitivity of the CCD. Thus, in original scanning, pixel data is binarized based on whether G pixel data from the sensor is equal to or larger than A0H, and when the number of pixels equal to or larger than 80H obtained by adding the binary pixel data exceeds 255, it is determined that an original is a copy-inhibited original, thus ending the copying operation as in the first embodiment.

If it is determined that an original is not a copy-inhibited original, the solenoid 5202 operates to move the base 5201 to a position shown in FIG. 19. Radiation light from the halogen lamp 5209 is radiated onto an original via the infrared cut filter 5216. In this case, since an original is illuminated with light which has almost no light wavelength components which can excite the fluorescent material, precise image data of an original will not be impaired by fluorescence. Light reflected by an original is transmitted through the glass 5217, and is guided to the sensor via the reflection mirror 206.

Fifth Embodiment

Figure 11:
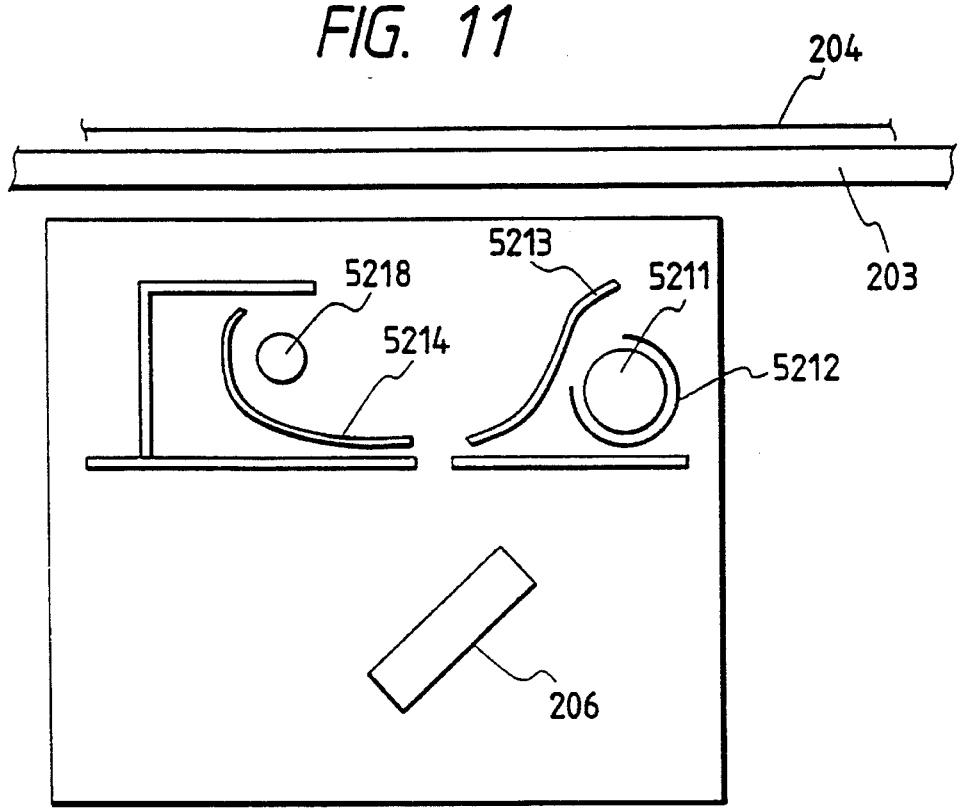
FIG. 11 is a schematic sectional view of an original illumination unit of an original reading apparatus using the fifth embodiment.

FIG. 11 is a schematic sectional view of an original illumination unit of an image forming apparatus according to the fifth embodiment. In the fifth embodiment, the arrangement of the original illumination unit is different from that in the first embodiment. Referring to FIG. 11, a fluorescent lamp 5211 emits light (ultraviolet rays) in a short-wavelength range, which can efficiently excite a normal fluorescent ink. A planar heat generating member 5212 controls the temperature of the fluorescent lamp 5211 to be constant together with a temperature sensor and a temperature control circuit (neither are shown). A halogen lamp 5218 emits visible light, and outputs almost no ultraviolet rays. Focusing reflection plates 5213 and 5214 are arranged for efficiently radiating light emitted from the halogen lamp onto an original. In particular, the reflection plate 5213 comprises a dichroic filter, which allows light of a wavelength lower than 400 nm to pass therethrough, and reflects light of wavelength equal to or higher than 400 nm. In the fifth embodiment, the halogen lamp can be turned on at a low voltage, and a compact original illumination unit can be achieved even though the fluorescent lamp is arranged.

Sixth Embodiment

Figure 21:
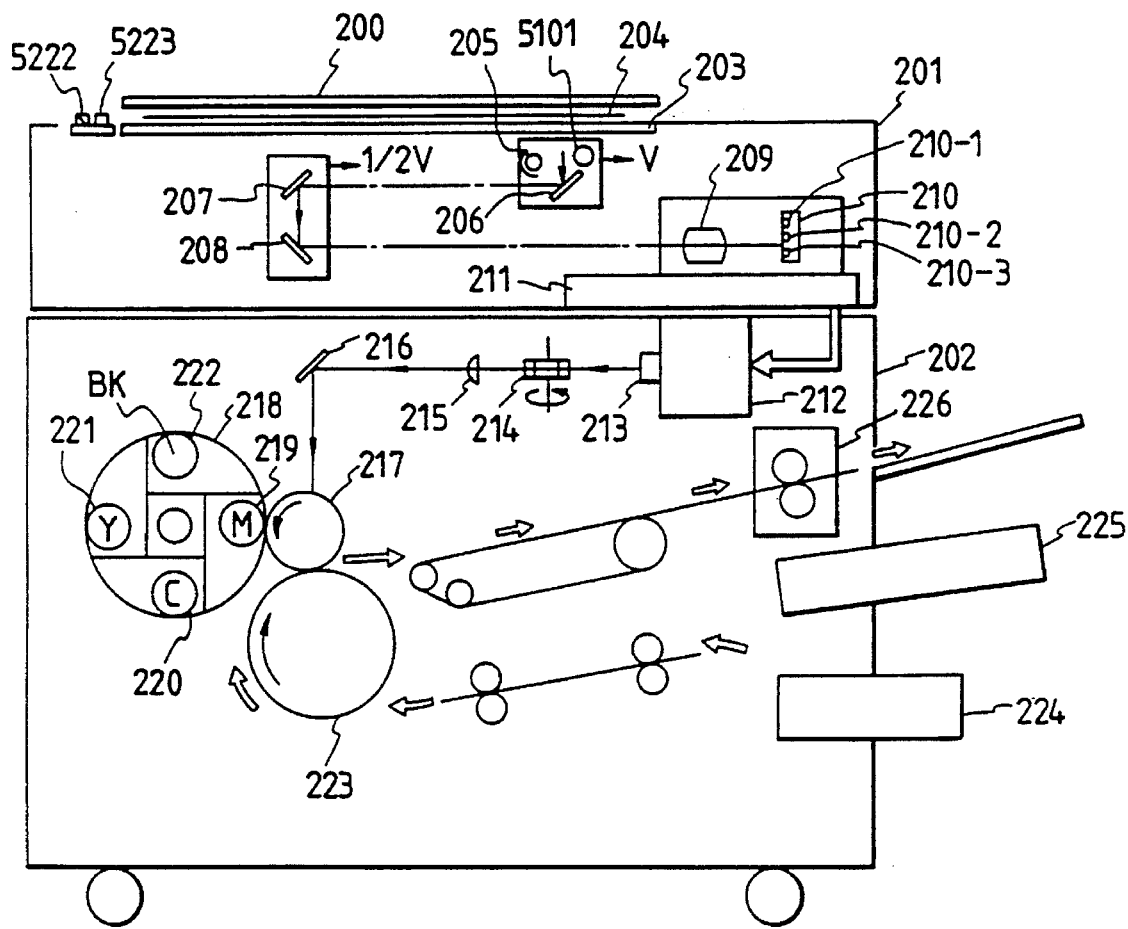
FIG. 21 is a schematic sectional view showing an arrangement of a color copying machine using the sixth embodiment.
Figure 22:
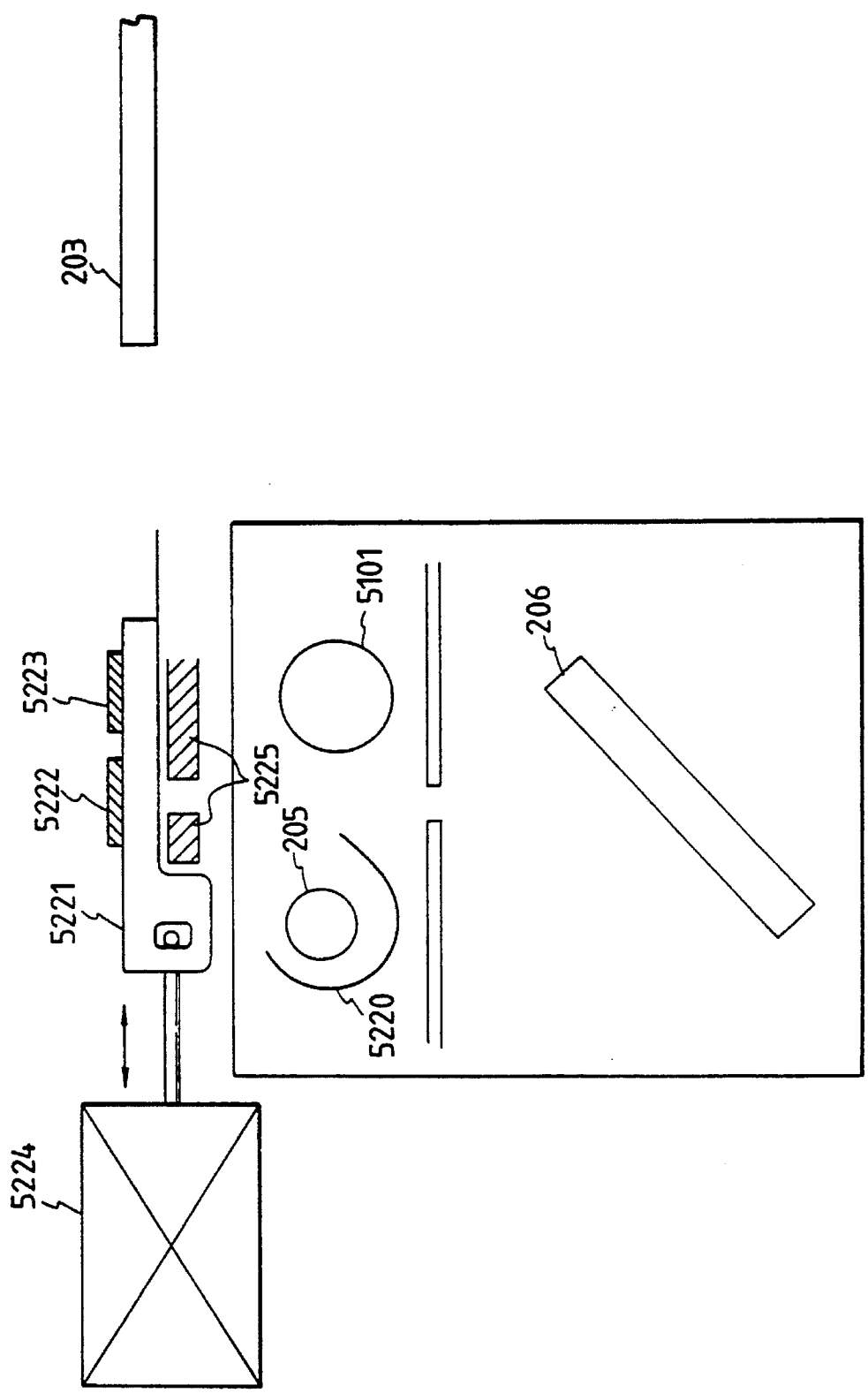
FIG. 22 is a partial sectional view showing an original reading apparatus using the sixth embodiment.

FIG. 21 is a schematic sectional view of an image forming apparatus according to the sixth embodiment. FIG. 22 is a partial sectional view of an image scanner unit of the image forming apparatus of the sixth embodiment. FIG. 22 shows a state wherein an original illumination unit is located at a home position.

A standard white plate 5222 is used for correcting data read by the sensor 210 when the halogen lamp 205 is used. A fluorescence reference plate 5223 is uniformly coated with a fluorescent ink which exhibits almost equivalent characteristics to those of the fluorescent ink of the first embodiment as an object to be detected, and is used for correcting output data from the sensor 210 when the fluorescent lamp 5101 is used.

When the halogen lamp 205 is used, correction is executed in the arrangement of the original illumination unit shown in FIG. 22. Also, when the fluorescent lamp 5101 is used, correction is executed by driving a solenoid 5224 to move a glass member 5221, on which the two reference plates are mounted, and which has the same thickness as that of the platen, so that the fluorescence reference plate 5223 is located at the position of the standard white plate 5222. When one correction means is executed, a light source associated with the other correction means is turned off so as not to influence the correction means being executed. Furthermore, a light-shielding member 5225 is used for preventing the standard white plate 5222 from deteriorating by light emitted from the fluorescent lamp 5101. Note that a common illumination light source may be used by switching filters as in the second embodiment.

Seventh Embodiment

Figure 23:
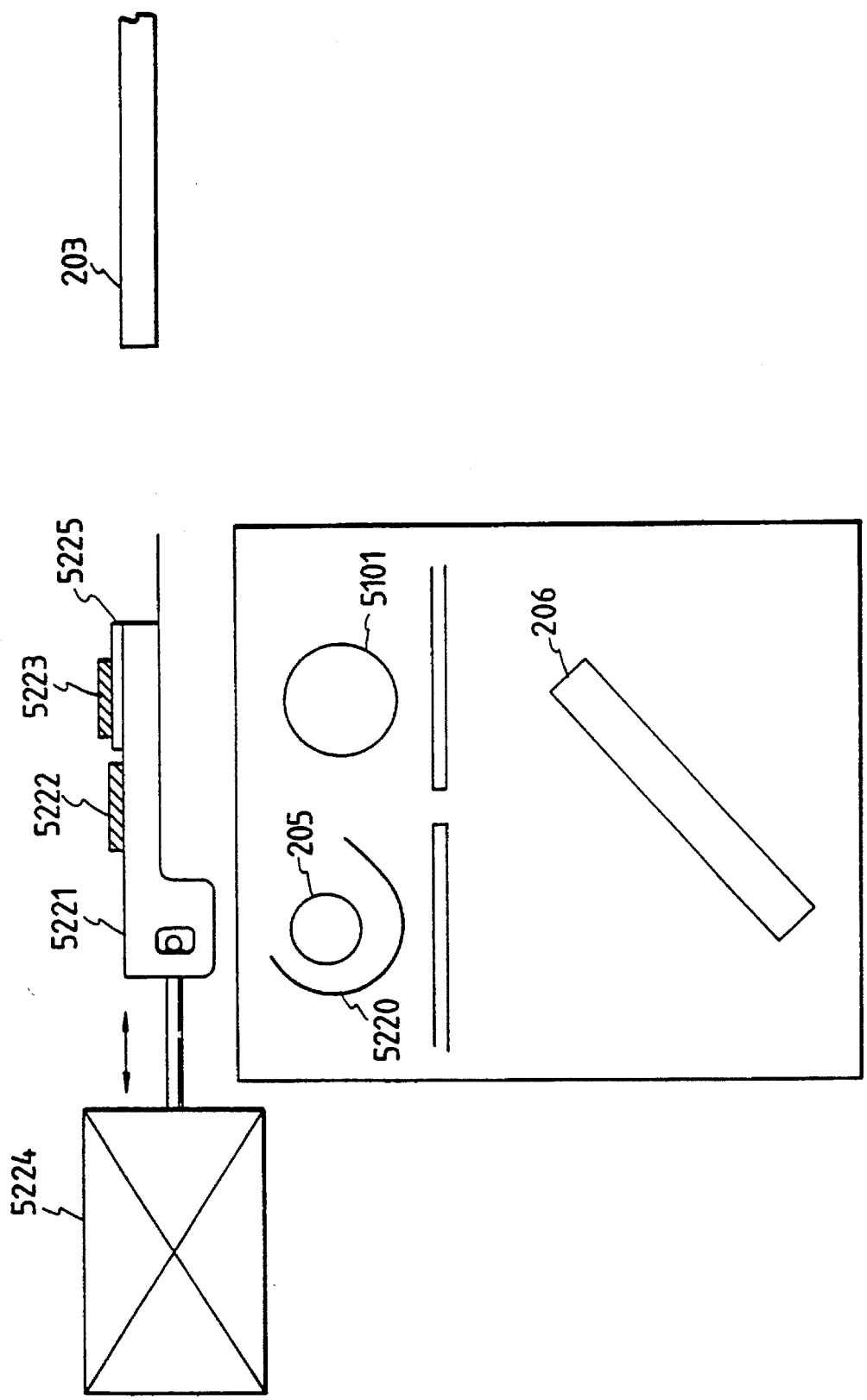
FIG. 23 is a partial sectional view showing an original reading apparatus using the seventh embodiment.

FIG. 23 is a partial sectional view of an image scanner unit of an image forming apparatus according to the seventh embodiment. FIG. 23 shows a state wherein an original illumination unit is located at the home position.

Figure 15C:
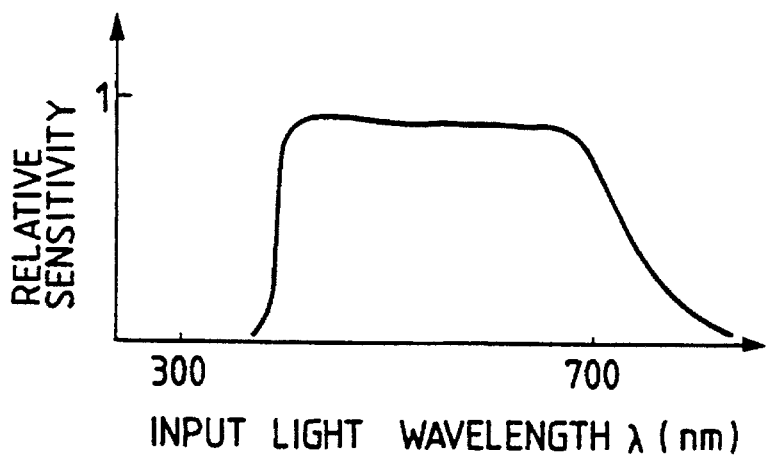

In the seventh embodiment, in order to prevent deterioration of the standard white plate, a thin-film ultraviolet cut filter 5225 which exhibits characteristics shown in FIG. 15C used in the second embodiment is inserted between the glass member 5221 and the standard white plate 5223 in place of the light-shielding member unlike in the sixth embodiment.

As processing for discriminating that an original image is a copy-inhibited original, in the above description, the copying operation is stopped, a copy is output with a copy-inhibited region painted in black, a copy is output after a fluorescent mark printed for discriminating a copy-inhibited original is visualized thereon, or the like. In addition, any other methods of stopping a normal copying operation may be adopted. For example, the entire output image, or one or a plurality of portions of an output image may be painted in white, black, or a specific color, or may be output in a specific pattern, a warning tone may be generated or may be supplied via, e.g., a modem, an original image may be inhibited from being removed, the functions of the entire apparatus are stopped, and so on.

As for the method of acquiring information of a fluorescent ink using the two systems of original illumination means, the two light sources may be moved to exchange their positions with each other, or an original illumination focusing reflection plate may be moved to switch the illumination means.

Also, in an original illumination system as a combination of a single light source and an optical filter, the light source may be moved relative to the fixed filter. The filter is not limited to a two-dimensional filter, but may have a curved shape, or a reflector having characteristics of a filter may be moved.

In the above embodiments, the halogen lamp or the fluorescent lamp has been exemplified. However, the present invention is not limited to these as long as a light source can emit light in a visible wavelength range.

In the above embodiments, the standard white plate and the fluorescence reference plate are separately prepared. However, the sensor outputs for both visible light and ultraviolet fluorescence may be corrected using a single reference plate by using an ultraviolet fluorescent material which exhibits characteristics of white color with respect to visible light.

As the single reference plate, a plate obtained by coating an ultraviolet fluorescent material, which exhibits characteristics of transparency with respect to visible light, on a reference plate which is white under visible light.

Also, a driver common to the fluorescent lamp and the visible light lamp may be used to alternately control these lamps.

Since the amount of reflected light obtained by exciting the fluorescent ink is very small, it cannot often be coped with by only changing the gains of the variable amplifiers. In this case, the accumulation time of the CCD may be changed in correspondence with which one of the halogen lamp and the fluorescent lamp is used.

In this embodiment, only the full-color reading apparatus has been described. However, the present invention can be applied to a digital monochrome copying machine using one or a plurality of lines of CCDs.

As described above, according to each of the embodiments of the present invention, since a fluorescent ink is detected from an original, a copy-inhibited original can be reliably detected.

Since the apparatus of each of the above embodiments has original illumination means having different light wavelength ranges, which include an original illumination means for exciting a fluorescent ink, information of only a fluorescent material can be read.

Of a plurality of original illumination means, when one light source is turned on to read image data, the other light source is turned off or its power is decreased, thus achieving precise reading.

In order to read fluorescence information, the fluorescence reference plate, which exhibits 10 fluorescent characteristics, is arranged, and the outputs from the sensor are corrected based on signals obtained by reading the reference plate, thus allowing precise reading of fluorescence information.

Since a plurality of reference plates for a plurality of light sources are arranged to be separated from each other, deterioration of the reference plates can be prevented.

Since the fluorescent characteristics of the fluorescence reference plate are set to be equivalent to those of a fluorescent ink printed on an original, fluorescence information can be read more precisely.

Since filters for changing the wavelength ranges of light for illuminating an original from a light source are switched, a single light source can achieve original illumination operations which exhibit different spectrum characteristics.

Since information which cannot be identified by visible light is recorded as visible information, a normal copying operation of a copy-inhibited original can be prevented.

As described above, according to the present invention, the characteristics of an original can be reliably detected with a simple arrangement.

Eighth Embodiment

Figure 25:
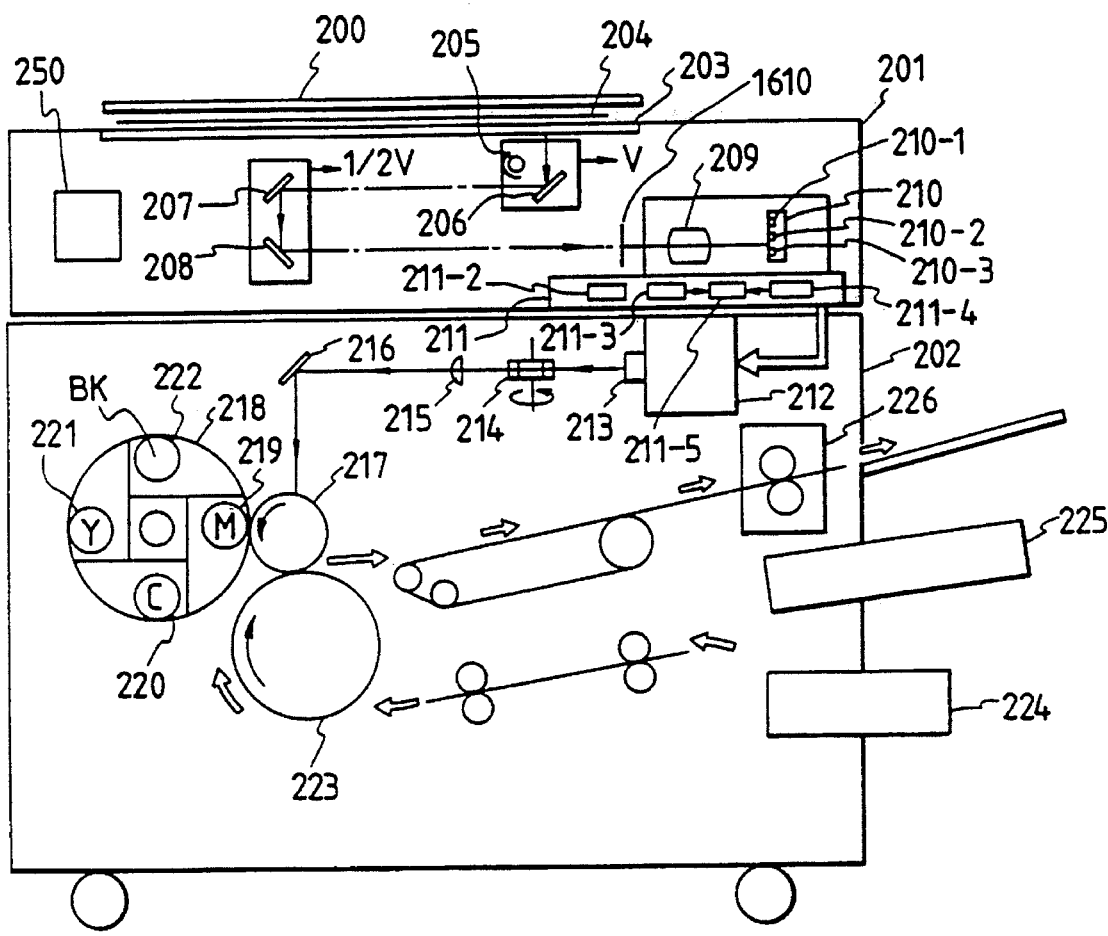
FIG. 25 is a schematic sectional view showing an arrangement of a copying machine of the eighth embodiment.

FIG. 25 is a schematic sectional view of an apparatus according to the eighth embodiment.

The same reference numerals in FIG. 25 denote the same parts as in FIG. 9, and a detailed description thereof will be omitted.

Figure 26:
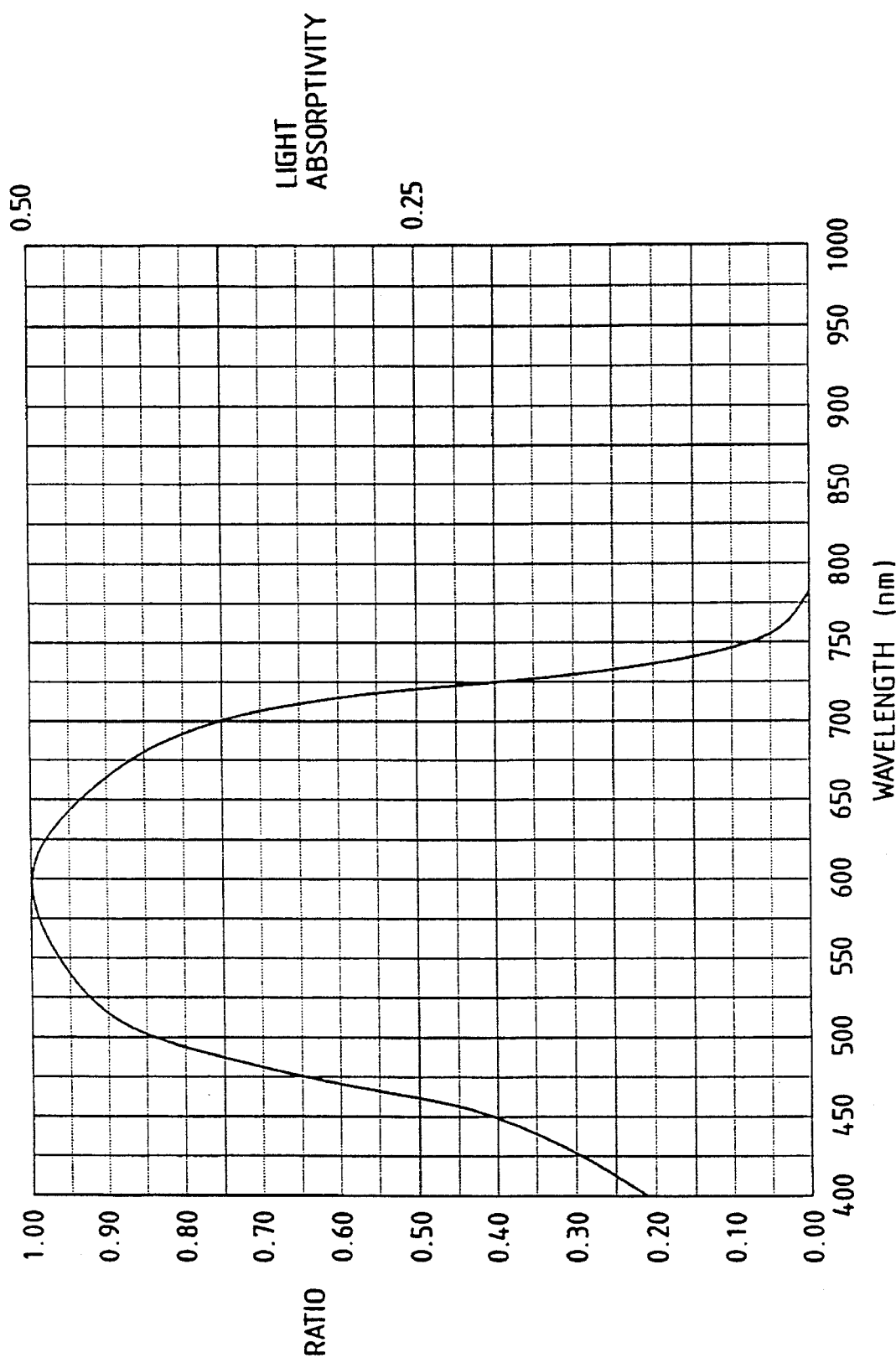
FIG. 26 is graph showing the spectrum distribution of a lamp used as a light source of the eighth embodiment.
Figure 27:
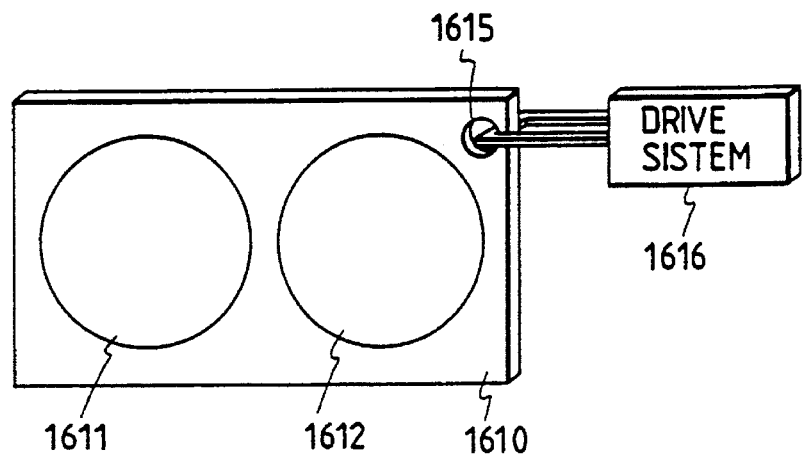
FIG. 27 is a perspective view showing the outer appearance of a filter frame of the eighth embodiment.
Figure 28:
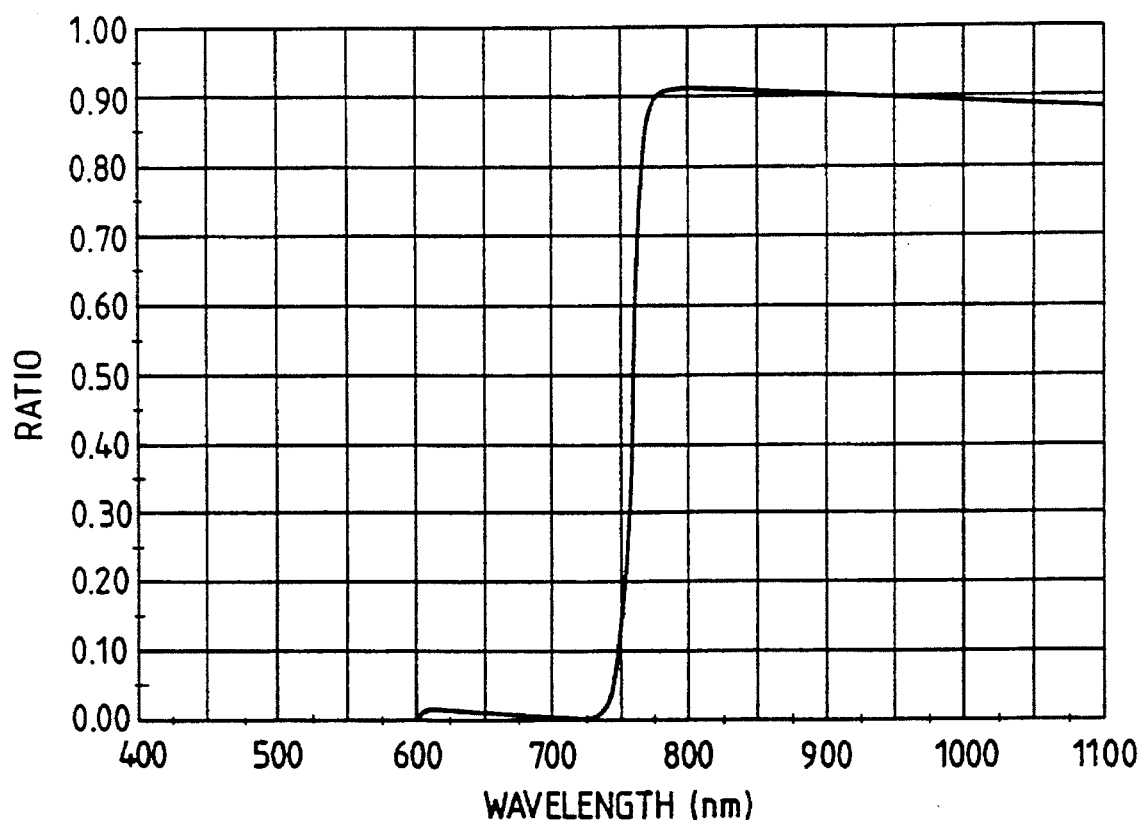
FIG. 28 is a graph showing the spectrum characteristics of a visible light cut filter of the eighth embodiment.

FIG. 27 shows the outer appearance of a filter frame 1610 (shown in FIG. 25) arranged between a mirror 208 and a lens 209. The filter frame 1610 comprises an infrared cut filter 1611 and a visible light cut filter 1612. FIG. 13 shows the spectrum characteristics of the infrared cut filter 1611. Of the spectrum characteristics of a halogen lamp 205 shown in FIG. 26, infrared rays of wavelengths equal to or higher than about 700 nm are cut by the infrared cut filter 1611. FIG. 28 shows the spectrum characteristics of the visible light cut filter 1612. Of the spectrum characteristics of the halogen lamp 205 shown in FIG. 26, visible light components of wavelengths equal to or lower than about 750 nm are cut by the visible light cut filter 1612.

The filter frame 1610 is moved by a drive system 1616 coupled to a hole 1615 in accordance with an original reading sequence, so that one of the infrared cut filter 1611 and the visible light cut filter 1612 is located in front of the lens 209. A CCD 210 comprises three line pixel arrays, i.e., a pixel array (to be referred to as an R pixel array) 210-1 deposited with an R filter, a pixel array (to be referred to as a G pixel array) 210-2 deposited with a G filter, and a pixel array (to be referred to as a B pixel array) 210-3 deposited with a B filter. FIG. 12 shows the spectrum characteristics of the filters deposited on the pixel arrays. Since the pixel arrays are arranged to be separated by a predetermined interval, line buffers are prepared at the output side of these pixel arrays, and are controlled, so that the read signals of the same line from the three lines are not simultaneously supplied to a signal processing unit 211.

A pattern recognition sequence will be described in turn below. In this embodiment, a copy-inhibited internal original will be exemplified as an example of an original to be prevented from being forged. However, the present invention is not limited to this, but may be applied to paper money such as bank notes of various countries, securities, and the like.

Original

Figure 24:
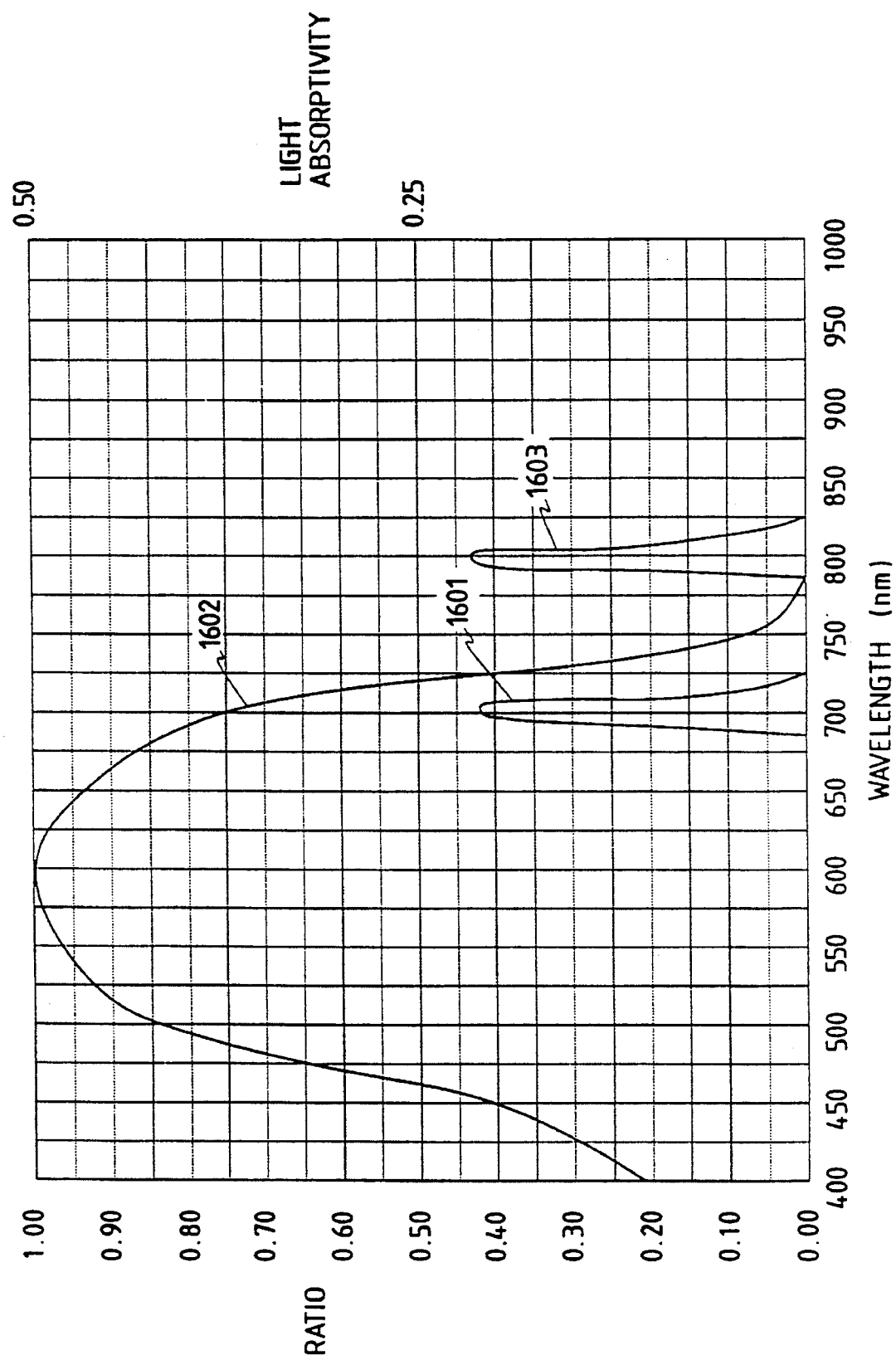
FIG. 24 is a graph showing the characteristics of an infrared fluorescent agent of the eighth embodiment.
Figure 29:
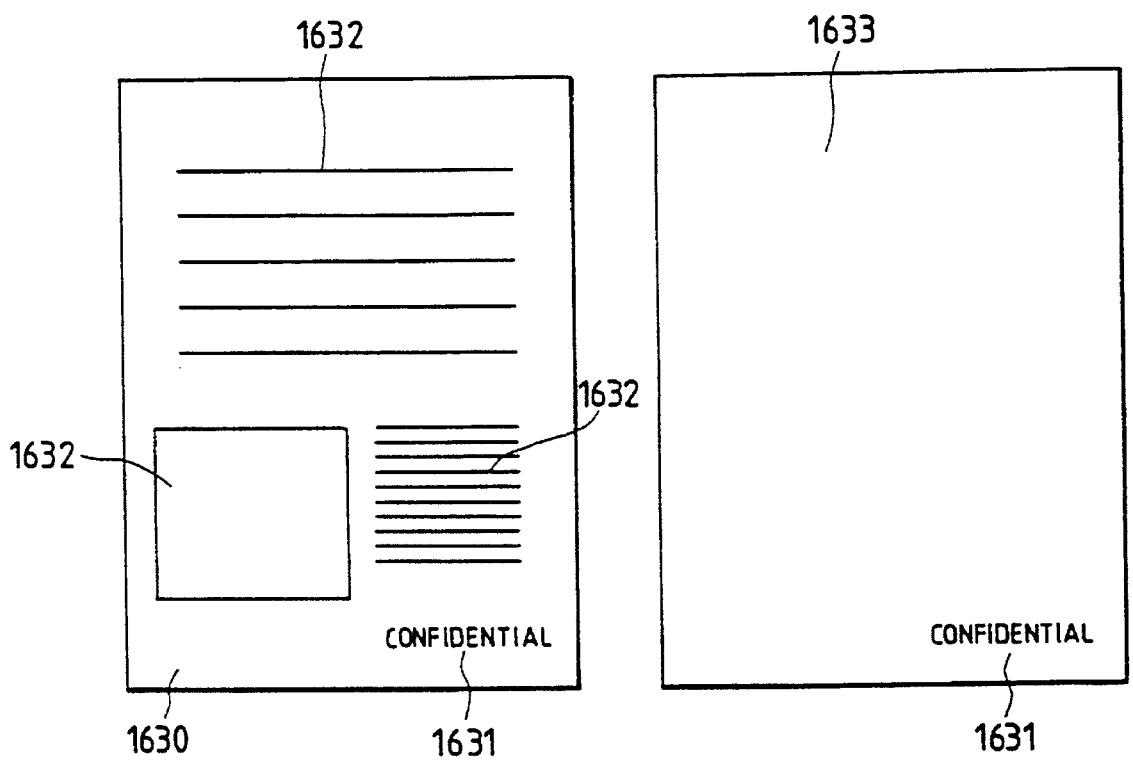
FIGS. 29A and 29B are views showing originals printed with patterns using an infrared fluorescent paint of the eighth embodiment.

FIG. 29A shows an internal original (to be simply referred to as an original hereinafter) 1630 on which a pre-registered pattern 1631 is printed using an infrared fluorescent paint. In addition to the pattern 1631, characters and an image 1632 are printed on the original 1630 using a normal ink. Fluorescence radiated from the infrared fluorescent paint to be printed is infrared rays of wavelengths equal to or higher than 700 nm, and is sensed to be transparent by human eyes, which have sensitivity in a range from 400 to 700 nm. Therefore, it is very difficult for human eyes to recognize this paint. This infrared fluorescent paint has a feature of emitting fluorescence of a specific wavelength upon radiation of excitation light having a certain wavelength range. FIG. 24 shows the light-emission characteristics of fluorescence. A curve 1601 shown in FIG. 24 represents the light absorptivity of the infrared fluorescent paint as a function of the wavelength. When this fluorescent agent receives light including infrared rays (the spectrum distribution of the light is expressed by a curve 1602 in FIG. 24; the light-emission intensity is plotted along the ordinate), it absorbs light in a wavelength range according to the characteristic curve 1601, and emits fluorescence whose spectrum distribution is expressed by a curve 1603 (the light-emission intensity is plotted along the ordinate). As a general feature of the fluorescent agent, when the agent absorbs excitation light, energy of radiation light is reduced by energy transition of molecules in the fluorescent agent. The radiation light is emitted as fluorescence at a wavelength higher than the excitation light since its energy is reduced. In FIG. 24, the peak wavelength of the excitation light is shifted by about 100 nm from that of the fluorescence.

The spectrum components 1603 of only the fluorescence can be extracted by cutting the wavelength components of the excitation light source using the visible light cut filter 1612. The extracted spectrum components are read by the R pixel array 210-1 of the CCD 210. This processing will be described in detail later.

Pre-scan

An image scanner unit 201 performs a pre-scan operation as pre-processing of a copying operation of the original 1630. The pre-scan operation will be described below.

Figure 30:
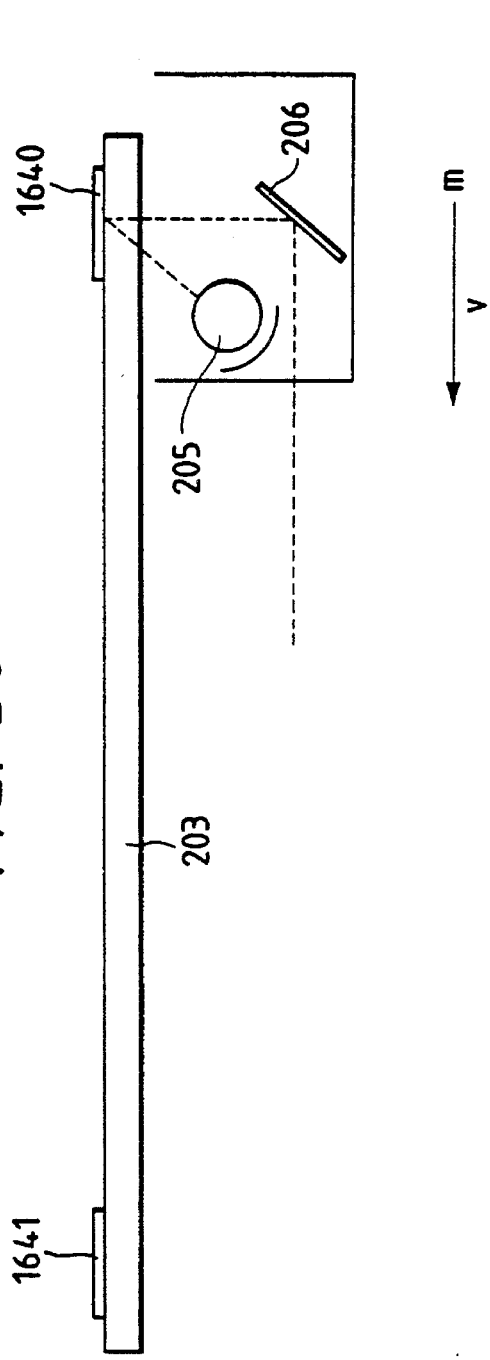
FIG. 30 is a schematic sectional view showing a white shading correction state of the eighth embodiment.

The lamp 205 radiates light onto a white shading plate 1640 adhered to a portion of a platen 203, as shown in FIG. 30. A reflected image from the white shading plate 1640 is focused on the CCD 210 via the mirrors 206, 207, and 208, the filter frame 1610, and the lens 209 shown in FIG. 25. At this time, the filter frame 1610 is moved by a drive system (not shown), so that the infrared cut filter 1611 is located in front of the lens 209. The image of the white shading plate 1640 read by the CCD 210 is subjected to signal processing in the signal processing unit 211. Correction data for illumination nonuniformity of the lamp 205, and sensitivity nonuniformity in units of pixels of the R, G, and B pixel arrays 210-1, 210-2, and 210-3 on the CCD 210 are generated, and are stored in a memory 211-2. Thereafter, the lamp 205 is mechanically moved by a drive system (not shown) at a speed v in the direction of an arrow m in FIG. 30, thereby scanning the entire surface of the original. At this time, the maximum and minimum values of original densities are sampled from the image of the original 1630 read by the CCD 210, and a print density setting value in the copying operation is calculated.

Figure 31:
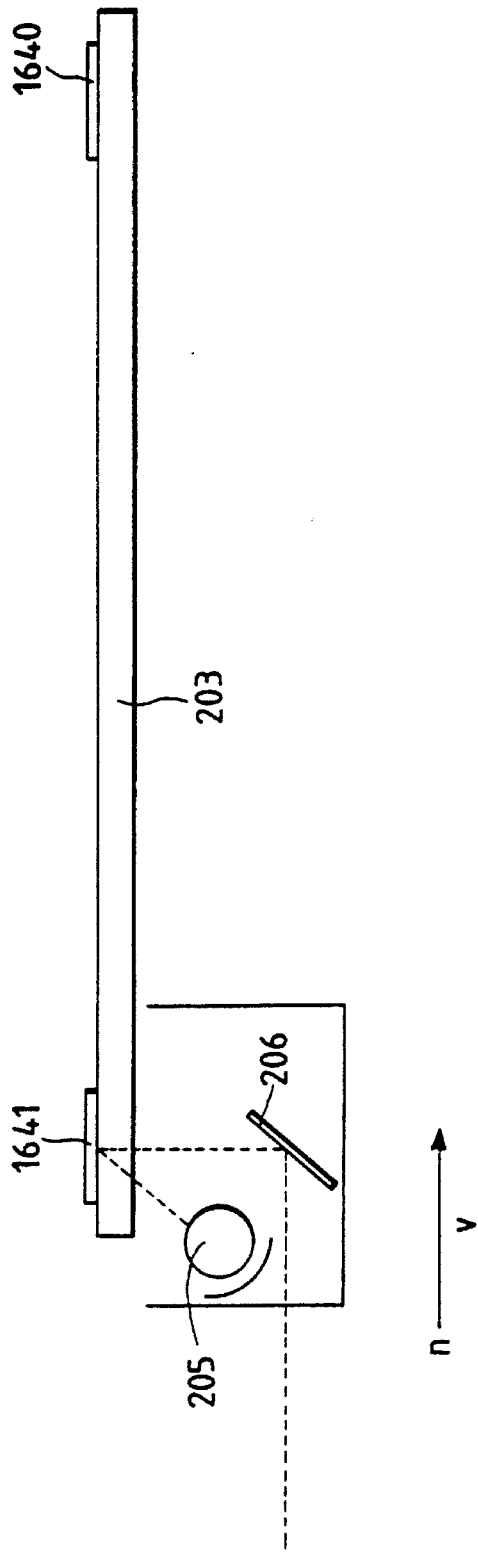
FIG. 31 is a schematic sectional view showing an infrared shading correction state of the eighth embodiment.

Upon completion of scanning of the final line of the original 1630, the lamp 205 then radiates light onto an infrared shading plate 1641 adhered to another portion of the platen 203, as shown in FIG. 31. In this embodiment, the infrared shading plate 1641 is adhered to the leftmost end portion of the platen 203, while the white shading plate 1640 is adhered to the rightmost end portion of the platen 203.

The infrared shading plate 1641 is uniformly coated with the above-mentioned infrared fluorescent paint, and emits fluorescence upon radiation of infrared rays included in light emitted from the lamp 205, as has been described above with reference to FIG. 24. At this time, the filter frame 1610 is driven by the drive system 1616, so that the visible light cut filter 1612 is located in front of the lens 209. Thus, only fluorescence is incident on the CCD 210. In this case, since light incident on the G and B pixel arrays 210-2 and 210-3 is cut over the entire wavelength range due to a synergistic effect of the filters deposited on these pixel arrays, and the visible light cut filter, only the R pixel array 210-1 whose transmission spectrum range extends up to an infrared range (see the curve Red in FIG. 12) can actually detect a signal. As described above, the infrared shading plate 1641 is arranged for correcting illumination nonuniformity of infrared rays included in light emitted from the lamp 205, and sensitivity nonuniformity of the CCD 210 with respect to infrared rays. With this arrangement, a high-precision infrared reading system can be realized, and shading correction processing can be executed not only for a visible light range but also for an infrared range. The energy of the infrared components of the lamp 205 is as low as a fraction of energy of the visible light components, and an image reading operation cannot often be satisfactorily attained if electrical setting of a scanner unit upon reading of the white shading plate or an original is left unchanged. Thus, in this embodiment, the infrared shading plate is arranged, as described above, and a drive signal of the CCD 210 is properly controlled to obtain an image signal of a sufficient level. Such control will be exemplified below.

Figure 32:
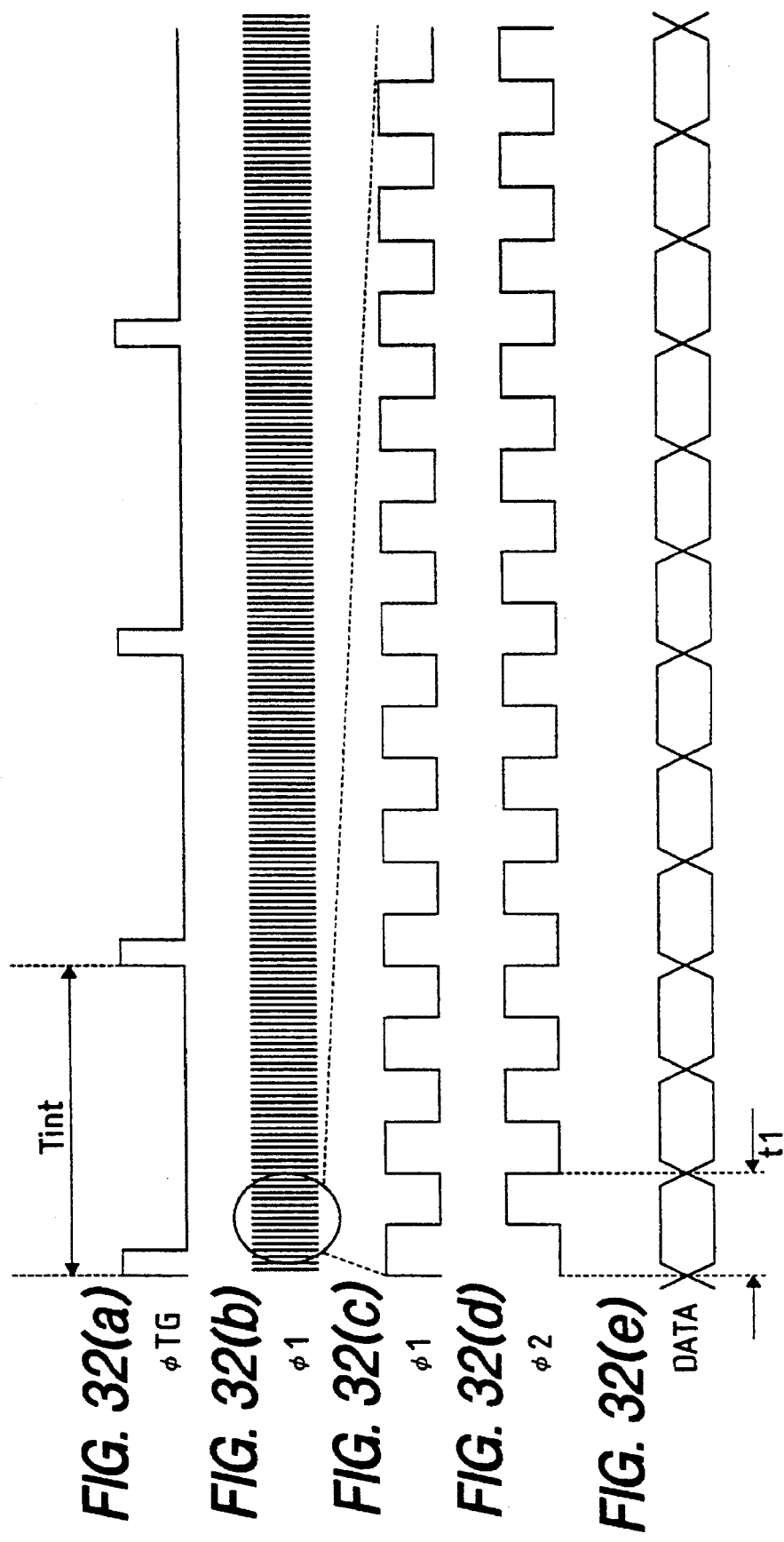
FIGS. 32(a)–32(e) are waveforms of a CCD driving timing chart of the eighth embodiment.

FIG. 32 is a timing chart of the drive signal of the CCD 210 upon reading of the white shading plate or an original. Signals $\phi 1$ and $\phi 2$ are transfer clocks of an internal shift register of the CCD 210, and a period T of the signals $\phi 1$ and $\phi 2$ is T=t1. Data for one pixel is output in one period of the signals $\phi 1$ and $\phi 2$. If the number of pixels of each of the R, G, and B pixel arrays of the CCD 210 is 5,000, a time required for outputting all the 5,000 pixels, i.e., 5,000×t1 corresponds to an accumulation time Tint. As is apparent from FIG. 32, the accumulation time Tint also corresponds to a time of one period of a main scan synchronization signal $\phi$TG of the CCD 210.

Figure 33:
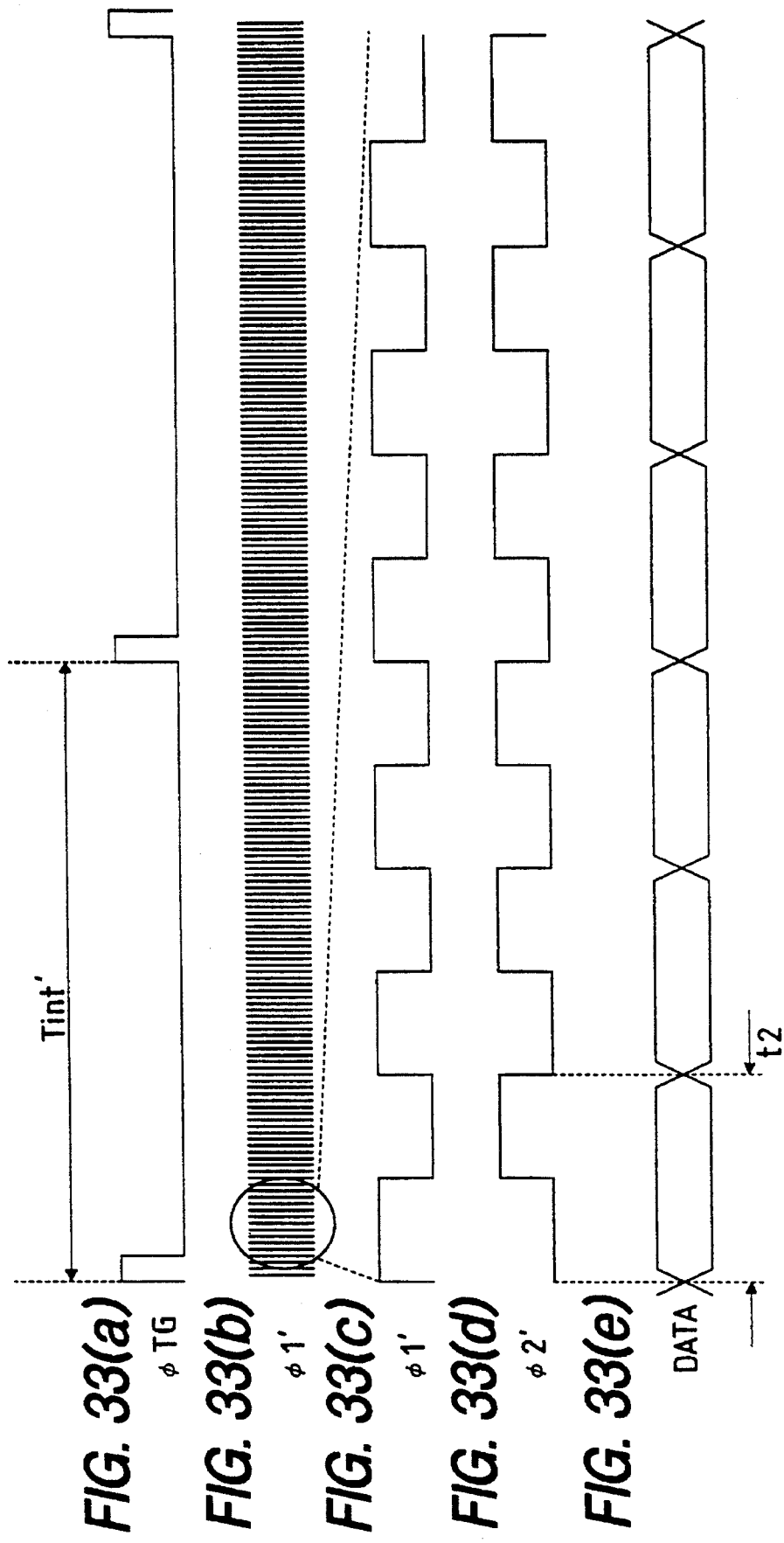
FIGS. 33(a)–33(e) are waveforms of a CCD driving timing chart of the eighth embodiment.

In contrast to this, FIG. 33 is a timing chart of the drive signal of the CCD 210 upon reading of the infrared shading plate or upon execution of pattern detection (to be described later). Signals φ1' and φ2' are transfer clocks of an internal shift register of the CCD 210. A period T' of the signals φ1' and φ2' is T'=t2=2×t1, and is twice as long as the period of the signals φ1 and φ2. Therefore, an accumulation time Tint' at this time becomes twice as long as the time Tint, and an image data output from the CCD 210 based on infrared rays is almost doubled, thus assuring a wide dynamic range.

If an output signal of a sufficient level cannot be obtained by this method, light amount adjustment control of the lamp 205 is also executed. More specifically, when the infrared shading plate is read, or pattern detection is executed, the light amount of the lamp 205 is controlled to increase up to a level at which a signal sufficient for reading can be obtained, thus obtaining an output signal of a level sufficient for reading and detection.

Furthermore, the gain of an analog amplifier unit for amplifying the output signal from the CCD may be switched. For example, in an infrared reading system, the gain is increased to increase the amplitude of a signal, thus assuring a sufficient dynamic range.

With the above-mentioned method, an image of the infrared shading plate 1641 is subjected to signal processing of infrared rays in the signal processing unit 211, and correction data for illumination nonuniformity of infrared components of light emitted from the lamp 205, and sensitivity nonuniformity of the R pixel array 210-1 on the CCD 210 with respect to infrared rays are generated. Thereafter, the lamp 205 is mechanically moved by a drive system (not shown) at the speed v in a direction of an arrow n (FIG. 31), thus starting an operation for returning the lamp 205 to the reading start position, i.e., the home position.

Pattern Detection

After the above-mentioned infrared shading correction processing is completed, the lamp 205 is moved in the direction of the arrow n, and is returned to the home position. At this time, the lamp 205 scans the original 1630 while it is kept ON, thereby detecting whether or not the pattern 1631 is printed on the original 1630. In this case, the filter frame 1610 is held in a state after the infrared shading correction processing. More specifically, the frame 1610 is driven, so that the visible light cut filter 1612 is located in front of the lens 209. An image is read by the R pixel array 210-1 for the above-mentioned reason. At this time, if no pattern 1631 expressed by the fluorescent agent is present on the original 1630, an image signal read by the CCD 210 has a level almost equal to the black level. However, if the pattern 1631 is present on the original 1630, only this portion emits fluorescence, and the pattern is detected by the R pixel array 210-1 of the CCD 210. FIG. 29B shows a state wherein the original 1630 including the pattern 1631 is read. Referring to FIG. 29B, the R pixel array 10-1 generates a white-level output in correspondence with the portion of the pattern 1631, while it generates a black-level output in correspondence with the remaining region 1633. The image shown in FIG. 29B, which is read by the CCD 210 is temporarily stored in a memory 211-3, and a discrimination circuit 211-5 checks if the stored image is similar to a pattern pre-registered in a memory such as a ROM 211-4. The discrimination method of these patterns is achieved by adopting a method known as pattern matching. Since the original 1630 may be placed on the platen 203 at every possible angle, patterns for various angles are preferably registered as long as the ROM capacity allows. Alternatively, in the case of similarity discrimination, one pattern is stored in the ROM, and the arrangement of the pattern stored in the ROM may be changed to attain various pattern discrimination operations. Furthermore, when discrimination is realized by the fuzzy theory, high-speed, high-precision discrimination can be realized.

Figure 37:
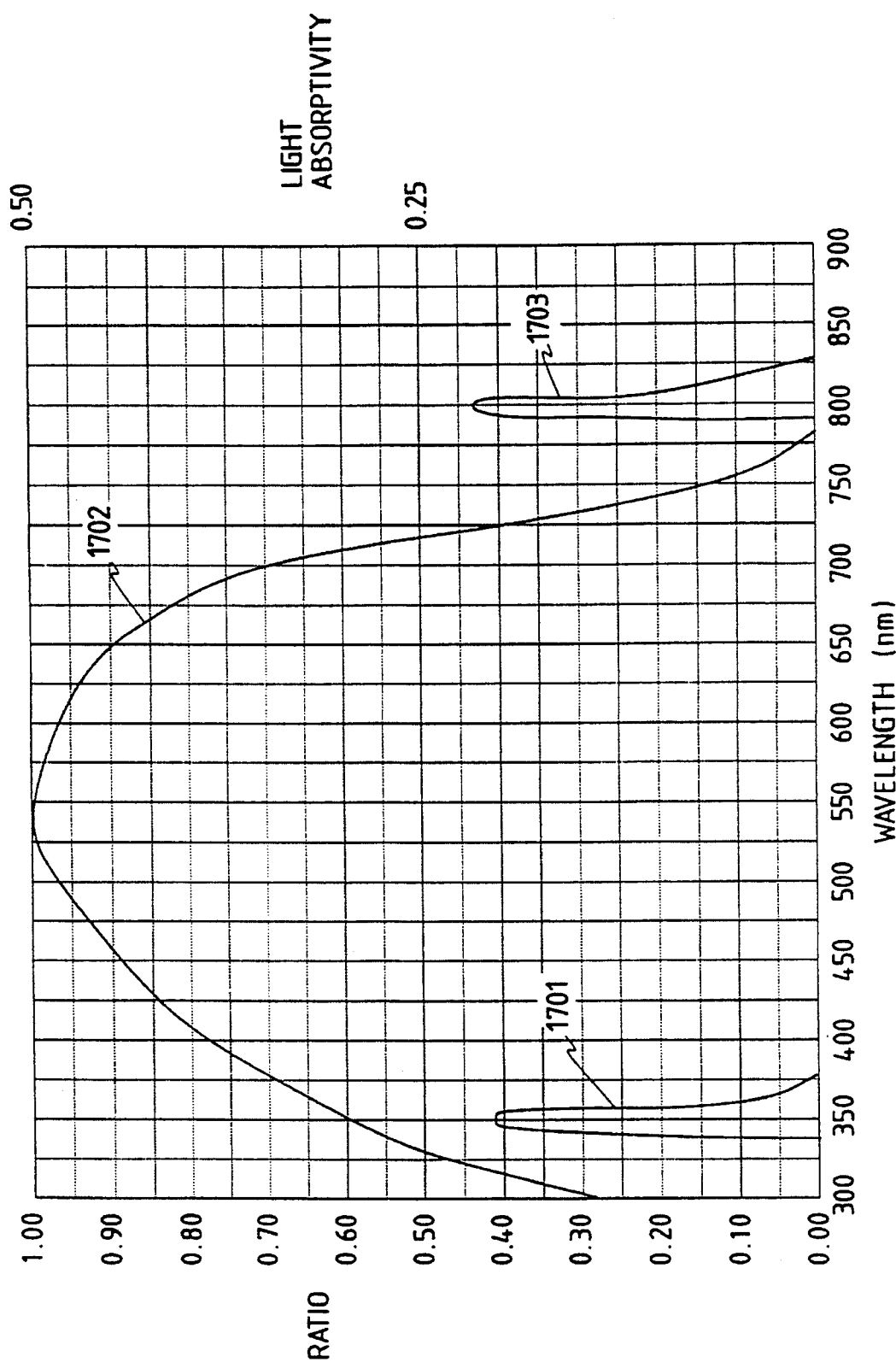
FIG. 37 is a graph showing the characteristics of another fluorescent paint.

The above-mentioned infrared fluorescent paint used for printing a pattern is assumed to have characteristics that both the excitation wavelength and the fluorescent wavelength are present in the infrared wavelength range, as shown in FIG. 24. However, according to the present invention, the fluorescent paint for printing a pattern is not limited to the paint having the above-mentioned feature. For example, as shown in FIG. 37, a pattern may be printed using an ultraviolet paint, which absorbs light in a wavelength range according to a characteristic curve 1701 expressing the light absorptivity as a function of the wavelength, and emits fluorescence whose spectrum distribution is expressed by a curve 1703 in FIG. 37. At this time, the spectrum distribution of the lamp 205 has characteristics expressed by a curve 1702, and at the same time, the visible light cut filter shown in FIG. 27 must have characteristics for cutting ultraviolet rays. Also, as shown in FIG. 38, a pattern may be printed using a visible light paint, which absorbs light in a wavelength range according to a curve 1711 expressing the light absorptivity as a function of the wavelength, and which emits fluorescence whose spectrum distribution is expressed by a curve 1713. At this time, the lamp 205 can have a spectrum distribution expressed by the characteristic curve 1602 described above with reference to FIG. 24, and the visible light cut filter 1612 shown in FIG. 27 can have characteristics shown in FIG. 26. In this case, since the visible light paint for printing a pattern is recognized by human eyes, such a paint is preferably applied to an original which has no difficulty even when a printed position of the pattern is recognized.

Original Copying

Upon completion of the pattern detection sequence, when the pattern is recognized, a control circuit 250 in the copying machine (FIG. 25) temporarily stops a copying operation. Thereafter, the control circuit 250 asks an operator for an identification number. When no identification number is input within a predetermined period of time, the original copying operation is stopped. When an identification number is input, the filter frame 1610 is driven by the drive system 1616, so that the infrared cut filter 1611 is re-arranged in front of the lens 609, and an original image is read while cutting unnecessary infrared rays. At this time, read image data is subjected to shading correction on the basis of shading correction data obtained by reading the white shading plate, and the corrected image data is subjected to image processing such as edge emphasis, masking processing, and the like in the signal processing unit 211. The processed image data is supplied to the printer unit 202, and the original image is copied.

Ninth Embodiment

Figure 35:
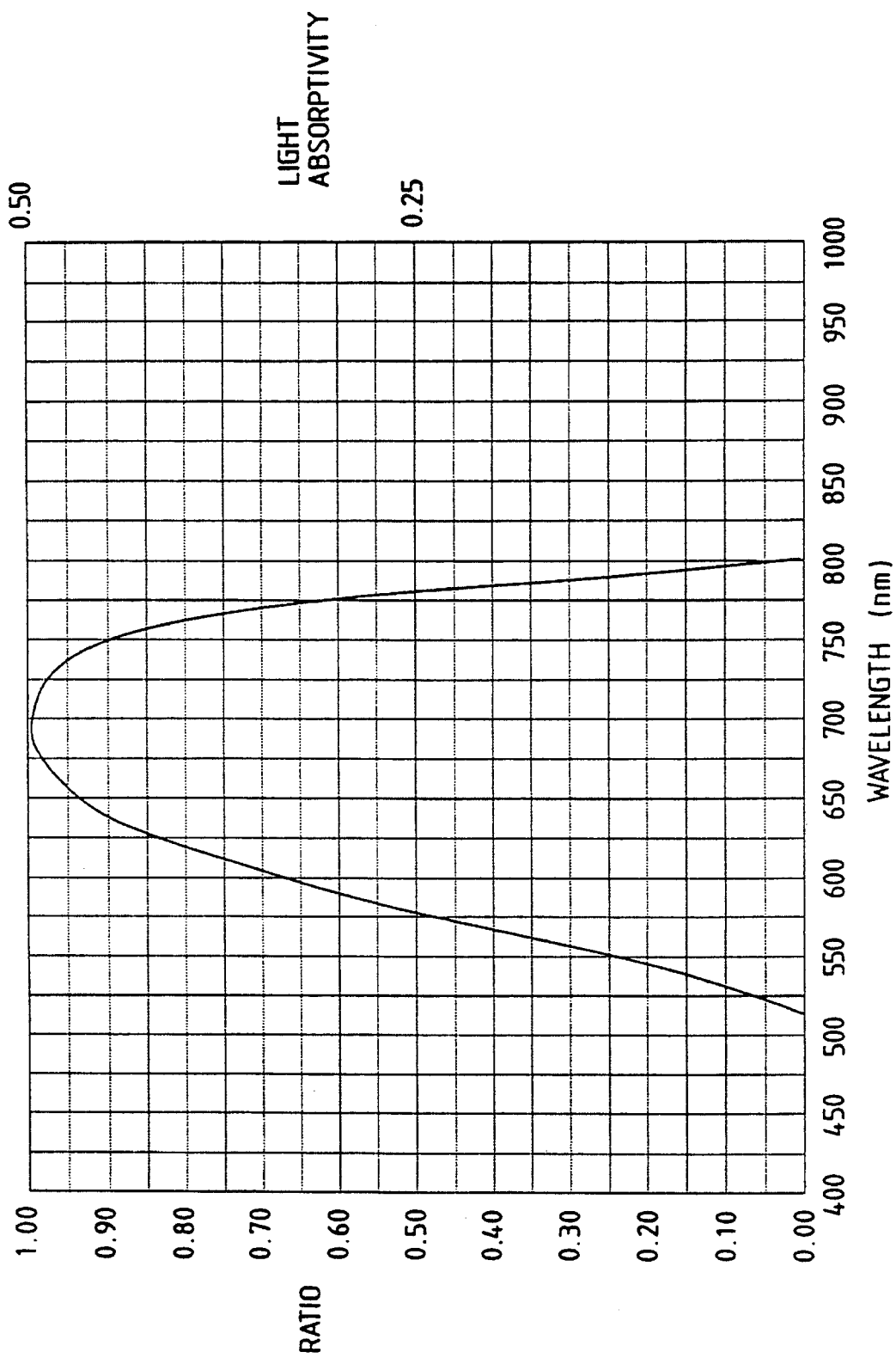
FIG. 35 is a graph showing the light-emission characteristics of a light source 670 used in FIG. 34.

In the above description, only one lamp is used as an illumination light source. However, as the lamp 205, a lamp having large energy of visible light components for reading an original is assumed, and infrared rays are secondary output components. Therefore, as shown in FIG. 34, as a light source upon reading of the infrared shading plate or upon execution of pattern detection, it is effective to add a lamp 1670 to the above embodiment of the present invention. More specifically, as shown in FIG. 35, the lamp 1670 has characteristics that it has small energy of visible light components but large energy of infrared components, and has no fluorescent spectrum components generated by the infrared fluorescent paint. Since the fluorescent agent has characteristics that the energy of fluorescence increases as the energy of excitation light is larger, an original is read by turning on the lamp 205 and turning off the lamp 1670 in an original reading mode, and is read by turning off the lamp 205 and turning on the lamp 1670 in a pattern detection mode, thus obtaining CCD outputs suitable for these reading modes.

Tenth Embodiment

In the above embodiment, the white and infrared shading plates are arranged at the two end portions of the platen, as shown in FIG. 30, 31, or 34. Alternatively, as shown in FIG. 36, two shading plates 1640 and 1641 may be integrally arranged. With this arrangement, since a limitation on the order of the pre-scan operation and the pattern detection described above can be removed, a copying operation can be performed in a convenient order depending on a mode for executing a copying operation. Also, a merit of a decrease in the number of parts can also be obtained.

Eleventh Embodiment

In the above embodiment, after shading correction using the white shading plate is performed, shading correction for the infrared wavelength range using the infrared shading plate is performed. When the positions of the two shading plates are replaced with each other, shading correction using the white shading plate may be performed after shading correction for the infrared wavelength range using the infrared shading plate is performed. With this control, since a time required from the copy start up to pattern detection can be shortened, even when an original printed with a pattern and an original without a pattern are mixed, the total copying processing time can be shortened.

Twelfth Embodiment

In the above embodiment, only one reading sensor is prepared, and is commonly used for both pattern detection and original reading. However, another sensor may be prepared for pattern detection. In pattern detection, a pattern need only be discriminated. For this reason, since the resolution is not particularly limited, and an inexpensive black-and-white sensor can be used, if a sensor having a wide opening window is selected to assure a required output dynamic range, pattern detection precision in a pattern detection mode can be improved.

Thirteenth Embodiment

In the above embodiment, when a pattern is detected on an original, an identification number is input, and only when a coincidence of the number is detected, original copying processing is allowed. Alternatively, some patterns may be registered in advance, and copying permission levels may be set in correspondence with the patterns. For example, the following application is available. That is, when a pattern "AAA" is detected, a copying operation is inhibited without any exceptions; when a pattern "BBB" is detected, a copying operation is allowed to only a person who can input an identification number.

When a pattern is detected on an original, an add-on pattern, which can be recognized by man may be added to a portion corresponding to the pattern, or when a pattern is detected on an original even partially, an add-on pattern may be added to the entire original. In this case, a copying operation of an original image need only be prevented by modifying an original image. When a specific image is detected, a copying operation may be stopped unconditionally.

When a pattern printed on, e.g., a specific original using a fluorescent paint is recognized, the spectrum distribution of fluorescence emitted from the paint falls within an infrared or ultraviolet non-visible light range. However, in shading correction processing executed by a normal image reading system, shading correction data is generated on the basis of data obtained by reading a standard white plate, and shading correction processing is executed based on the generated data. For this reason, sufficient correction cannot be expected upon reading of a non-visible light range. Therefore, image reading precision and discrimination of a specific image cannot have a satisfactory level.

However, in the above embodiment, in an apparatus in which a predetermined pattern is printed on a copy-inhibited original using an infrared fluorescent paint, and a copying machine comprises infrared fluorescence reading means, shading correction processing is performed based on data obtained by illuminating a first shading correction plate suitable for a reading system using infrared light in a pattern recognition sequence, and shading correction processing is performed based on data obtained by illuminating a second shading correction plate suitable for a reading system using visible light in a reading sequence. Therefore, the shading correction can be satisfactorily performed in both the recognition sequence and the reading sequence.

Since these sequences can use a common reading sensor and illumination light source, the apparatus can be simplified, and cost can be reduced.

According to the present invention, a specific image can be stably and automatically discriminated with high precision.

In the above embodiment, the copying apparatus has been exemplified. However, the present invention is not limited to the copying apparatus, but may be applied to various image input apparatuses such as a scanner as a method of discriminating a specific original.

What is claimed is:

1. An image reading apparatus which comprises first illumination means for radiating a visible light, second illumination means, different from the first illumination means, for radiating non-visible light, and detection means for detecting light obtained from an image in accordance with the visible and non-visible light radiated onto the image from the first illumination means and the second illumination means, said apparatus comprising:

first reference means for reflecting a first reference light, in accordance with the radiation from the first illumination means, to correct at least one of the first illumination means and the detection means; and second reference means, different from the first reference means, for reflecting a second reference light, in accordance with the radiation from the second illumination means, to correct at least one of the second illumination means and the detection means, wherein said first and second illumination means time-divisionally radiate the visible light and the non-visible light, respectively.

2. An image reading apparatus according to claim 1, wherein the detection means comprises a CCD sensor.

3. An image reading apparatus according to claim 1, wherein the second illumination means comprises means for radiating ultraviolet light.

4. An image reading apparatus according to claim 1, wherein the first illumination means and the second illumination means radiate light non-simultaneously.

5. An image reading apparatus according to claim 1, wherein the corrections of the first illumination means and the second illumination means are corrections of an amount of illumination light.

6. An image reading apparatus according to claim 1, wherein the detection means is a sensor and the correction of the detection means is an output correction of the sensor.

7. An image reading apparatus according to claim 1, further comprising discrimination means for discriminating a specific image in accordance with the light obtained from the image that is detected by the detection means.

8. An image reading apparatus according to claim 7, wherein the specific image is a bank note.

9. An image reading apparatus according to claim 7, wherein said discrimination means discriminates the specific image in accordance with a characteristic of the non-visible light.

10. A copying apparatus which comprises first illumination means for radiating visible light, second illumination means for radiating non-visible light, and detection means for detecting light obtained from an image in accordance with the visible and non-visible light radiated onto the image from the first illumination means and the second illumination means, said apparatus comprising:

first reference means for reflecting a first reference light, in accordance with the radiation from the first illumination means, to correct at least one of the first illumination means and the detection means; and second reference means, different from the first reference means, for reflecting a second reference light, in accordance with the radiation from the second illumination means, to correct at least one of the second illumination means and the detection means, wherein said first and second illumination means time-divisionally radiate the visible light and the non-visible light, respectively.

11. A copying apparatus according to claim 10, wherein the detection means comprises a CCD sensor.

12. An image reading apparatus according to claim 10, wherein the second illumination means comprises means for radiating ultraviolet light.

13. An image reading apparatus according to claim 10, wherein the first illumination means and the second illumination means radiate light non-simultaneously.

14. An image reading apparatus according to claim 10, wherein the corrections of the first illumination means and the second illumination means are corrections of an amount of illumination light.

15. An image reading apparatus according to claim 10, wherein the detection means is a sensor and the correction of the detection means is an output correction of the sensor.

16. An image reading apparatus according to claim 10, further comprising discrimination means for discriminating a specific image in accordance with the light obtained from the image that is detected by the detection means.

17. An image reading apparatus according to claim 16, wherein the specific image is a bank note.

18. An image reading apparatus according to claim 16, wherein said discrimination means discriminates the specific image in accordance with a characteristic of the non-visible light.

* * * * *

UNITED STATES PATENT AND TRADEMARK OFFICE
CERTIFICATE OF CORRECTION

PATENT NO. : 5,617,187
DATED : April 1, 1997
INVENTOR(S) : HAYASHI, ET AL.

It is certified that error appears in the above-indentified patent and that said Letters Patent is hereby corrected as shown below:

<u>COLUMN 5</u>:

Line 65, "AVE signal" should read --A VE signal--.

Signed and Sealed this

Twenty-sixth Day of August, 1997

Attest:

BRUCE LEHMAN

Attesting Officer

Commissioner of Patents and Trademarks